(12) United States Patent
Arbel et al.

(10) Patent No.: US 9,754,059 B2
(45) Date of Patent: *Sep. 5, 2017

(54) GRAPHICAL DESIGN VERIFICATION ENVIRONMENT GENERATOR

(71) Applicant: Vtool Ltd., Herzelia (IL)

(72) Inventors: Hagai Arbel, Paris (FR); Asi Lifshitz, Kfar-Saba (IL)

(73) Assignee: VTOOL LTD., Herzelia (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/293,466

(22) Filed: Oct. 14, 2016

(65) Prior Publication Data

US 2017/0032058 A1 Feb. 2, 2017

Related U.S. Application Data

(63) Continuation of application No. 14/565,636, filed on Dec. 10, 2014, now Pat. No. 9,501,594.

(Continued)

(51) Int. Cl.
*G06F 17/50* (2006.01)

(52) U.S. Cl.
CPC ........ *G06F 17/504* (2013.01); *G06F 17/5022* (2013.01); *G06F 17/5036* (2013.01);

(Continued)

(58) Field of Classification Search
None
See application file for complete search history.

(56) References Cited

U.S. PATENT DOCUMENTS 5,164,911 A * 11/1992 Juran ................... G06F 17/5045
345/418
5,325,534 A * 6/1994 Galy ................... G06F 17/5009
703/2

(Continued)

OTHER PUBLICATIONS

A. Lifshitz, "Vtool—From Theory to Practice"—believed to have been publicly presented in February at the SemIsrael Verification Day 2013; http://www.semisrael.com/events/semisrael-verification-days/verificationday2013; 26 pages.*

(Continued)

*Primary Examiner* — Leigh Garbowski
(74) *Attorney, Agent, or Firm* — Fitch, Even, Tabin & Flannery LLP

(57) ABSTRACT

A graphical tool creates design-verification environments. The tool includes a graphical environment builder that allows for the drag and drop addition of verification IP ("VIP") modules to a graphical verification environment. The tool assigns connector signals associated with source code that simulates a connection between a VIP module and the device under test ("DUT"). The tool learns which connection signals are suitable to connect a VIP to the DUT and facilitates selecting of the suitable signals in the environment development process. The tool converts the graphical environment to source code that can be executed to simulate testing on the DUT. The tool also allows a user to navigate between view modes that display the verification environment graphically, and that display the source code associated with components of the verification environment.

22 Claims, 15 Drawing Sheets

Related U.S. Application Data

(60) Provisional application No. 61/978,899, filed on Apr. 13, 2014.

(52) U.S. Cl.
CPC ...... *G06F 17/5081* (2013.01); *G06F 17/5009* (2013.01); *G06F 2217/86* (2013.01)

(56) References Cited

U.S. PATENT DOCUMENTS

| | | | | |
|---|---|---|---|---|
| 5,371,851 A * | 12/1994 | Pieper | ............ | G01R 31/318307 345/501 |
| 6,505,338 B1 * | 1/2003 | Suzuki | ................ | G06F 17/5045 716/101 |
| 6,691,301 B2 * | 2/2004 | Bowen | ................ | G06F 17/5045 712/15 |
| 7,475,000 B2 * | 1/2009 | Cook | ................ | G06F 17/5045 703/13 |
| 7,610,569 B2 * | 10/2009 | Park | ................ | G06F 11/2733 703/20 |
| 7,613,599 B2 * | 11/2009 | Bade | ................ | G06F 17/5022 703/14 |
| 8,127,261 B2 * | 2/2012 | Auerbach | ................ | G06F 8/34 714/46 |
| 8,146,061 B2 * | 3/2012 | Xu | ................ | G06F 11/362 345/501 |
| 8,205,174 B2 * | 6/2012 | Li | ................ | G06F 17/5022 716/100 |
| 8,387,002 B2 * | 2/2013 | Dellas | ................ | G06F 8/34 717/104 |
| 8,782,581 B2 * | 7/2014 | Agarwala | ............ | G06F 17/5022 716/104 |
| 8,924,912 B2 * | 12/2014 | Ho | ................ | G06F 11/362 716/106 |
| 9,081,924 B2 * | 7/2015 | Chen | ................ | G06F 17/5022 |
| 9,235,669 B2 * | 1/2016 | Přikryl | ................ | G06F 17/5045 |
| 2003/0009730 A1 * | 1/2003 | Chen | ................ | G06F 17/5022 716/102 |
| 2013/0318486 A1 * | 11/2013 | Sasaki | ................ | G06F 17/5045 716/106 |

OTHER PUBLICATIONS

R. Drechsler et al., "SyCE: An Integrated Environment for System Design in SystemC," Proc. of the 16th Int'l Workshop in Rapid Prototyping (RSP'05), 2005 IEEE, 3 pages.*

D. GroBe et al., "Efficient Automatic Visualization of SystemC Designs," 2003 Forum in Specificationa dn Design Languages, pp. 646-657.*

N. Kim et al., "How to Automate Millions of Lines of Top-level UVM Testbench and Handle Huge Register Classes," ISOCC 2012 IEEE, pp. 405-407.*

Y.-N. Yun et al., "Beyond UVM for Practical SoC Verification," ISOCC 2011 IEEE, pp. 158-162.*

* cited by examiner

GRAPHICAL DESIGN VERIFICATION ENVIRONMENT GENERATOR

RELATED APPLICATIONS

This application is a continuation of pending U.S. application Ser. No. 14/565,636, filed Dec. 10, 2014, which claims the benefit of U.S. Provisional application No. 61/978,899 filed Apr. 13, 2014, titled "Methods, Circuits, Devices, Systems and Associated Computer Executable Code for Simulation Based Verification Testing of an Integrated Circuit Design." Both U.S. application Ser. No. 14/565,636 and Provisional application No. 61/978,899 are incorporated by reference in their entireties herein.

TECHNICAL FIELD

The present disclosure generally relates to electronic design verification testing. More specifically, the present disclosure relates to systems and methods that create a verification environment via a graphical interface that simulates testing on an integrated circuit device.

BACKGROUND

Designing an integrated circuit involves considering factors that relate to electronic circuits, analog functions, logic, and other functionality. For example, before it is released for production (i.e., tape out), an integrated circuit device may undergo a series of simulation tests to ensure that the integrated circuit will operate as planned. These simulation tests can be used to find bugs, mistakes, or other issues with the device. This simulation is referred to as design verification.

Design verification can provide several benefits. For example, design verification can reduce the need for tape out processes that can be expensive and time consuming, which can prolong the time it takes to bring the device to market. That is because the design verification environment can simulate and/or emulate the bugs and other problems that would otherwise be found by the end customers, thereby allowing the design team to fix the problems before significant time and money is sunk into production. Examples of devices that can benefit from the verification process include memory devices, communication circuitry, modems, smart phones, and field programmable gate arrays, among others.

This verification process can involve several engineers collaborating in a combined effort to check and test multiple circuits under various circumstances and operating environments. Universal Verification Methodology (UVM) is a standardized protocol designed to help unify techniques for verifying integrated circuit designs. UVM provides a library of automation features that are compatible with the System-Verilog language and can include, for example, sequences and data automation features such as packing, copy, compare, and the like.

UVM provides a common framework for developing verification environments across various platforms and circumstances. However, using UVM still requires manual coding, which can be a time consuming and laborious task. This manual coding process can last from few working days to few working weeks. Manually written environments are also error-prone and do not always follow the methodology. Furthermore, their structure can vary within the same project, which makes the maintenance, reuse and hand-over difficult.

SUMMARY

Certain embodiments of the present disclosure describe a computer and/or a computer processor configured to generate a design verification environment. The design verification environment simulates testing on an integrated circuit device under test ("DUT"). The processor is in communication with a user interface and a memory (e.g., an electronic storage device such as a hard drive or a memory chip). The computer processor is configured to execute a series of programs, which may collectively be referred to as a verification tool.

The programs of the verification tool include an environment building program that builds a graphical environment for display on the user interface. The graphical environment includes at least one verification graphic, and each verification graphic is associated with source code that simulates a verification module interacting with the integrated circuit device upon execution. The processor is also configured to execute a signal connector program that assigns connection signals to verification graphics in the graphical environment. The connection signals are associated with source code that simulates a connection between a verification module and the integrated circuit device upon execution. The processor is also configured to execute a code generating program that generates test simulation code. The test simulation code simulates operation of the integrated circuit device when it is executed, for example, by a simulator or simulation program. The memory maintains an available verification module array that includes at least one verification graphic.

In operation, the environment building program displays the available verification module array and the graphical environment via the user interface. The environment building program also adds verification graphics to the graphical environment in response to receiving a command, such as an add-graphic input signal, from the user interface. The signal connector program assigns a connection signal for each verification graphic of the graphical environment. The code generating program generates a test simulation code in response to receiving a command, such as a generation input signal, via the user interface. The test simulation code is based at least in part on the source code associated with each verification graphic of the graphical environment and each connection signal generated by the signal connector program. The test simulation code is formatted for execution on a simulator that can simulate testing of the integrated circuit device.

Certain embodiments of the present disclosure also present methods for coding a verification environment that can be used to simulate testing on an integrated circuit DUT. The methods are be carried out by a computer having a memory, a processor, and a user interface. In some examples, the method can be carried out by the computer and/or the computer processor executing the programs described above. The method involves displaying a graphical environment model on a user interface in response to receiving a command, such as an input signal via the user interface. The graphical environment model includes a device graphic that represents the DUT. The method also involves maintaining an available verification module array on the computer memory. The available verification module array includes at least one verification graphic that corresponds to source code representing a verification module. The method also displays at least one verification graphic in the graphical environment model in response to receiving a command, such as an add-graphic input signal, via the user interface. The verification graphic added to the graphical environment model is associated with source code that simulates a verification model interacting with the integrated circuit device upon execution. The method also assigns at least one connection signal to each verification graphic in the graphical environment. Each connection signal is associated with source code that simulates as connection between the verification model and the integrated circuit device upon execution. The method also generates a test simulation code in response to receiving a command, such as a generation input signal, via the user interface. The test simulation code is based at least in part on the source code associated with each verification graphic in the graphical environment model and each generated connection signal. The test simulation code simulates operation of the integrated circuit device upon execution. The method also formats the code, or transmits the test simulation code to a simulator that can simulate testing of DUT.

Some examples of the technology presented in present disclosure relate to computer readable storage mediums that are encoded with instructions that, when executed by a computer, cause the computer to perform a series of steps that result in the coding of a verification environment that can be used to simulate testing on an integrated circuit DUT. The instructions can be carried out by a computer having a memory, a processor, and a user interface. In some examples, the instructions can be carried out by the computer and/or the computer processor described above. And in some embodiments, the instructions represent source code that executes the programs described above, including, for example, the environment building program, the signal connector program, the code generating program, the learning program, the navigation program, and the verification graphic building program. The instructions execute to display a graphical environment model on the user interface in response to receiving a command, such as a model display input signal, via the user interface. The graphical environment model comprises a device graphic associated with source code that simulates the integrated circuit device upon execution. The instructions also execute to maintain an available verification module array on the computer memory. The available verification module array includes at least one verification graphic associated with source code that simulates a verification module interacting with the integrated circuit device upon execution. The instructions also execute to display at least one verification graphic in the graphical environment model in response to receiving a command, such as an add-graphic input signal, via the user interface. The instructions execute to assign at least one connection signal to each verification graphic in the graphical environment. Each connection signal is associated with source code that simulates a connection between the verification model and the integrated circuit device upon execution. The instructions also execute to generate a test code in response to receiving a command, such as a generation input signal or a save signal, via the user interface. The test code is based at least in part on the source code associated with each verification graphic in the graphical environment model and each assigned connection signal. The generated test code simulates operation of the integrated circuit device when it is executed, for example, by a simulator, or a simulation program.

DETAILED DESCRIPTION

Figure 1:
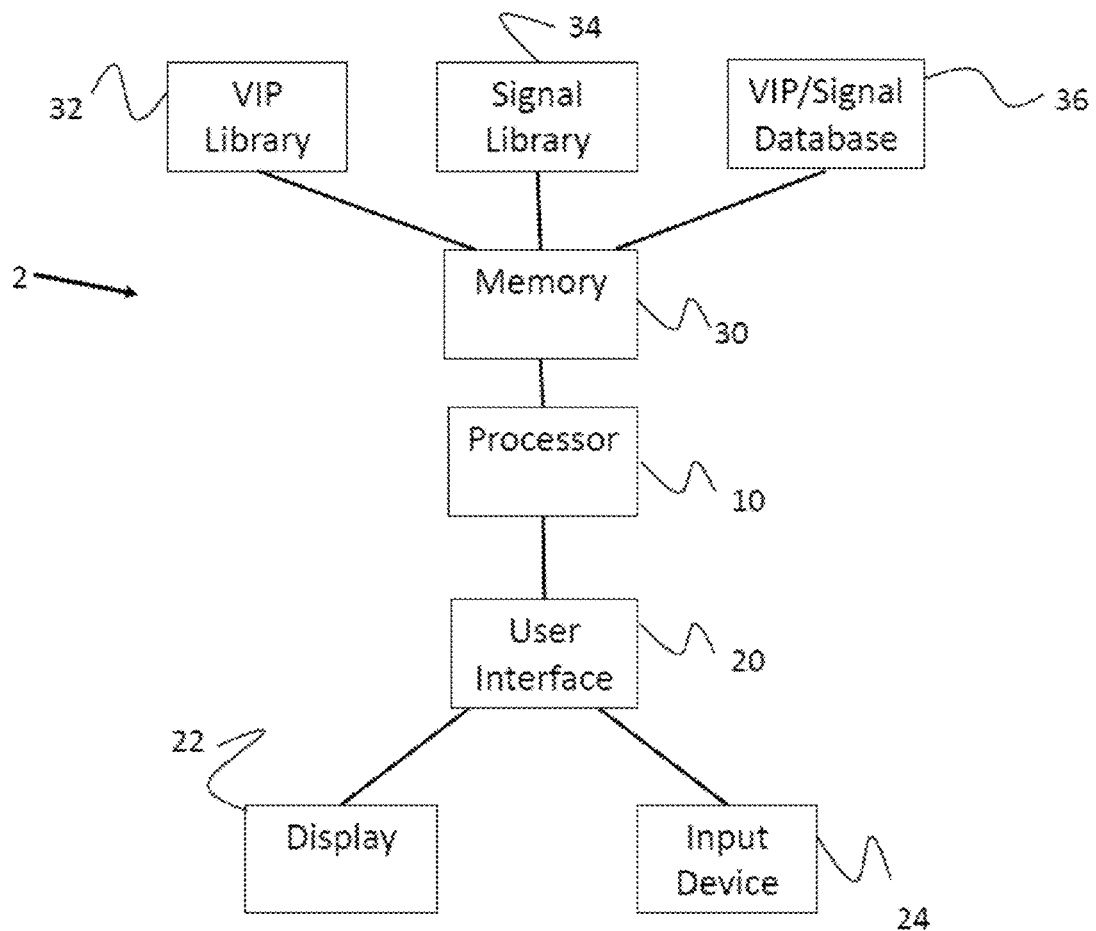
FIG. 1 is a block diagram showing components of a computer system used in accordance with at least one example of the present disclosure.

The present disclosure describes embodiments of computer implementable techniques or programs (hereinafter the "verification tool") that allow for efficient and convenient production of design verification environments when compared to manual coding techniques. Certain embodiments of the verification tool can create design verification environments that have a uniform structure, and that are compatible with Accellera guidelines for UVM. The code that the verification tool generates can be scalable and tested with a cross-simulator.

Creating a design verification environment can involve a lot of manual coding, and can be a very labor intensive process. Generally, when creating a design verification environment, a user will first create one or more verification Intellectual Property ("VIP") interfaces that drive and monitor signals that are connected to and/or transmitted to and from the DUT. The VIPs have interfaces that represent signals and other interactions with the DUT.

Next, the user can manually connect the DUT signals to the VIP interfaces. This is done by way of generating code that represents these connections.

Next, a developer will create files and classes in accordance with the UVM standard so that the environment is scalable and can be compiled. A developer can then connect all the transaction level modeling ("TLM") ports and callbacks that reside in the VIPs to the environment scoreboard (i.e., a reference model or a "golden model"), which notify the scoreboard on any bus activity. The scoreboard can monitor the inputs, outputs, and the configuration of the DUT, predict the expected outputs, and issue notifications such as error messages when the actual behavior does not match the expected behavior. The developer can then create scripts for running the environment using the preferable simulator. Finally, the developer documents the entire environment. This manual process can be very labor intensive and time consuming.

Some design verification environment building tools employ template generators to help with generating environments. Template generators can create appropriate files in response to a name provided via user input. While these template generators can be helpful and more efficient than manually coding the files, the resulting templates may still require lots of manual work to run properly. Further, these template generators do not create a full verification environment. Rather, the template generators simply create VIPs. Thus, these template generators do not instantiate the VIPs, nor do they facilitate in connecting the VIPs to the DUT.

Templates generators may be packaged and shipped with simulators, thereby aiming to provide a simulation device that can generate VIPs. However, as noted, these devices are limited, and cannot create a complete configuration interface, coverage, or sequence. Furthermore these generators do not document the VIPs that they generate, and thus do not preserve valuable information that can be used to facilitate generating future design verification environments.

Accordingly, while these template generators and related simulators may provide skeleton frameworks that can save time in the design verification environment generation process, they do not address the problem of creating a verification environment with its underlying VIPs and the connection to the DUT.

The presently described technology provides programs and methods that can add verification modules (which can be, for example, VIPs) to a graphical environment using a drag-and-drop operation. This feature can alleviate the cumbersome manual coding process for VIPs, and in some instances every VIP, in an environment. The verification tool provides verification modules (e.g., VIPs) that can be embedded, packaged, and/or shipped with the verification tool software, or created by it.

These verification modules can implement a well-known or standardized structure so that the modules can be easily parsed by the verification tool. This feature allows the verification tool to produce coding that can instantiate and connect the verification modules embedded in the verification environment.

In some aspects, the environments that the verification tool creates are fully compliable by common simulators (e.g., IUS, VCS and Questa). Further, the environments can be scalable, so that a user can embed the environment in a cluster environment or a full-chip environment. The environments can also include many, most, or even all of the notifications needed to simulate interactions between the verification modules (e.g., VIPs) and a scoreboard by way of TLM ports and callbacks.

In some examples, the DUT may comprise several modules, at least one of which is verified using a block level verification approach. An operator can integrate the existing environments in order to maintain knowledge of which of the DUT modules may be causing a problem. This process of integrating manually coded environments can be cumbersome and involve connecting the block-level environments to the signals within the DUT. However, the present verification tool can include a connectivity database so that a computer or computer processor can automatically perform the interface connection process, for example, by applying the known hierarchy of the module within the DUT. Further, in some examples, the verification tool can also instantiate the environments in a manner similar to the way that the tool instantiates VIPs in block level environments.

In certain embodiments, the verification tool employs a wizard, or a signal connector program, to automatically connect and/or facilitate connecting the verification module signals (e.g., VIPs signals) to the DUT. The signal connector program can assign connection signals, or otherwise connect signals associated with verification modules/VIPs with signals associated with the DUT. The signal connector program can also maintain and update a database of previously connected signals, such that the more environments that the verification tool creates, the better the tool becomes at automatically assigning and/or recommending connections. The verification tool can be configured to parse and present the DUT inputs and outputs, as well as all the verification module/VIP interfaces and associated signals.

Unlike other techniques that require these connections to be manually performed by one or more verification engineers, and typically by a team of verification engineers, the presently described verification tool can perform these functions automatically based on information learned while building previous verification environment. Additionally and/or alternatively, the presently described verification tool can suggest or recommend connections so that a user can still assign the connections manually, but with the assistance and guidance of the verification tool program. For example, the verification tool can list the recommended connections in a tree-view fashion, such that each interface can be expanded or collapsed while presenting its signals. The manual coding and connection work can be exhaustive on the engineer, as it can involve navigation through each interface in order to extract its signals. This exhaustive work leaves the engineer susceptible to leaving some signals unconnected or partially connected. It also leaves the engineer susceptible to copy and paste errors, or for accidental connection of the same signal more than once.

The presently described hardware, software, methods, and techniques also provide for easy navigation through the environment components, properties and source code. This is provided because of the verification tool's ability to filter, highlight and perform changes without deeply diving into an existing code. A user of the verification tool can have all, or virtually all tools helpful to build an environment in one place accessible via a single interface. In this manner, the user may not need to navigate through many folders and files, searching for some piece of code to build an environment.

Certain embodiments described herein are methods, circuits, devices, programs, systems and associated computer executable code for simulation based validation testing of an integrated circuit design, which circuit design may be referred to as a DUT. The DUT can include analog circuit segments, digital circuit segments, or both. Some embodiments present a circuit design testing platform that simulates operation and assess performance of the DUT across a range of operational conditions and/or in response to a variety of external signaling sequences, sequence permutations or scenarios.

External signaling to the DUT during validation testing can be generated during simulation by one or more verification modules, which can be, for example, VIPs, ancillary circuit models, or the like. The verification modules can link to the DUT simulation model. The verification modules can be predefined, as part of an array (or library) of verification modules, or a blank verification module. In this manner, the verification tool can automatically generate verification modules based via a graphical environment building program in response to a user command or input via a user interface.

The verification tool can link the verification modules to the DUT model via the graphical environment, which can also be linked to a test simulation code generator. The DUT together with the verification modules establish a design verification environment. The verification tool can also link or integrate one or more design verification environments and/or additional DUTs via the environment builder program and/or the test code generating program.

During testing, the DUT model operation can be simulated under the same operational conditions, for example, clock frequencies, configuration values, power modes, clock skews, negative testing, reset during operation, overflow, underflow, random delays in the inputs, back-pressure, random data sizes, or the like. As part of a given DUT test, the verification tool can alter the initial operational conditions of the DUT. Prior to testing, the code generator can generate or regenerate the test simulation code, replacing one verification module with another verification module from the array of available verification modules (or VIP library). For example, the code generator can combine source code that is affiliated with various modules of a graphical environment in response to receiving a command from a user via a user interface. Additionally, the verification tool can replace and/or partially replace the verification module while maintaining and/or preserving code that a user can add via a user interface.

Other embodiments of the present disclosure describe verification checkers. The verification tool can automatically configure a checker based on a predefined protocol or algorithm (for example using C or MATLAB). A checker can be, for example, a comparator or a component responsible for verifying that the DUT outputs are operating as expected. In some examples, checkers can be integrated within the environment scoreboard.

Additional embodiments can also present a library of predefined environment architectures that a user can select to be tested on the DUT. These predefined environment architectures may be characterized so that most DUTs are included within at least one architecture. The predefined environment architectures can include, for example, expected simulation inputs to the DUT and may automatically configure the checker/scoreboard/reference model. Automatic building of the checker may include receiving parameters from a user using the user interface.

In some aspects of the technology described herein, the code generating program includes both predefined verification environment architectures, blank architectures and/or user-definable architectures that can be defined via a user interface. The code generating program can include data item structure with user selectable variables, data types, randomization selection and more.

The code generating program can also access and/or include one or more verification modules that include a library of available verification modules (i.e., a VIP library). The code generating program can include a graphical signal interface between one or more verification modules and the DUT, and between one or more verification modules so that connection between the modules of the graphical environment (e.g., graphics representing the verification module(s) and the DUT) provides an interactive interface that is user friendly, thereby reducing errors and/or mistakes through interaction with the interface.

Some embodiments of the verification tool employ a user interface that allows a user to create a functional coverage model and test scenarios. Some embodiments provide a user interface that allows a user to add system verilog assertions from a built-in library. Some embodiments provide a verification plan, and techniques for creating a register database and code. Some embodiments also provide a verification simulator that includes a smart log that facilitates and/or enables post processing of simulation log files for efficient debugging of a simulation.

The presently described verification tool provides systems and techniques that connect verification module interfaces to a DUT by using a graphical interface. The verification tool employs drag-and-drop functionality via a user interface. In this manner, a user can select a verification graphic, which represents a verification module (e.g., a VIP interface) from a list, or array of available verification graphics, and add that graphic to a graphical environment. This drag and drop functionality makes the building of the simulation and the reuse extremely simple, and can be done by users with even very limited knowledge of the verification environment protocol. This also allows for a process that is much less error-prone compared to manual connections.

In some embodiments, the verification tool has machine-learning capabilities and can suggest or recommend connecting signals that connect verification modules with the DUT in the graphical environment. This process can be performed initially by name (e.g., the verification tool will try to pair the VIP signals and the DUT signals according to their names and directions). Then, as the verification tool builds more environments, the verification tool (e.g., via a learning program) collects data and improves its suggestion and/or recommendations.

The verification tool also provides a connectivity display where the verification module (e.g., VIP interface) represented by the verification graphics are listed separately. Further, the verification tool can be configured to select a verification module signal/DUT signal pair from a signal library (e.g., from a "connected" column) whenever such a pair is added to the graphical environment. This can help a user or environment developer to observe which signals are connected and which are not.

In some aspects, the verification tool can also make its own suggestions and can automatically assign or connect verification module signals to the DUT signals and shift them to the "connected" column. The verification tool is also configured to parse the verification module (e.g., VIP), so that it can present the module's elements and also perform all the connectivity (e.g., instantiation, signals, TLM ports, callbacks) between the environment, the DUT and the selected verification module (e.g., VIP).

Certain aspects of the described verification tool also include a navigation program that provides a graphical interface that facilitates navigation among various verification components (e.g., verification modules, features of the integrated circuit device, and/or design environments). This feature allows a user to display and edit existing components at various levels, and in various formats (e.g., graphical formats, source code formats, hybrid formats, etc.).

Referring now to the drawings, which demonstrate the various features, components, and operations of the verification tool in accordance with some embodiments. FIG. 1 is a block diagram showing components of an example computer system 2 configured to operate a verification tool consistent with embodiments of the present disclosure.

The computer system 2 comprises a computer processor 10, CPU, computer, multiple processors, other such devices or combinations of such devices. In some aspects, the one or more processors can be implemented within a single computer. In other embodiments, two or more processors can be implemented in multiple devices that are coupled to communicate, for example, through a network such as a local area network ("LAN"), wide area network ("WAN"), the internet, and/or another such network.

The processor 10 interacts with a user interface 20, which can include a display 22 and an input device 24. The display 22 can be, or can include, for example, one or more of a monitor, printer, touch screen, audio device, or other computer-related devices that present output generated by the computer. The input device 24 can be or can include, for example, one or more of a keyboard, a mouse, a touch screen, a microphone, a touch pad, or other computer-related devices that allow a user to interact and provide feedback with a computer.

In some embodiments, the display 22 and input device 24 can be the same, or at least intertwined. For example, the user interface 20 can include a touch screen that provides both the function of the display 22 and the input device 24. Essentially, the user interface allows a user to interact with the computer, and provides relevant information that the computer generates to the user.

The processor also comprises and/or accesses memory 30, which can be an electronic storage device. For example, the memory 30 can include a hard drive, a thumb drive, an SD card (or micro SD card), RAM memory, or other storage media, or a combination of such memory. The memory 30 can also be on the cloud or the internet, for example, and in some embodiments can include a network or other communication device that allows information stored on the memory 30 to communicate with the processor 10, and the user interface 20.

The memory can be configured to store a number of files, libraries, databases, and other information and electronic data. For example, in some embodiments, the memory 30 is configured to store a VIP library 32 (or a verification module library), which can be, or can include one or more arrays of available verification graphics suitable for adding to a graphical environment. The verification tool can come pre-loaded with available verification models in the VIP library 32. Additionally and/or alternatively, the processor 10 can maintain, update, and/or modify the VIP library 32 either automatically, or in response to controls via the user interface. For example, a user may update the VIP library 32 to include newly developed verification modules built using the verification tool.

The memory 30 can also include a signal library 34, which can be, or can include one or more arrays of available connection signals that simulate a connection between a verification module (e.g., a VIP) and a DUT. In some embodiments, the signal library constitutes the VIP interface, listing all the connections and/or possible connections between a VIP and a DUT.

The verification tool can come pre-loaded with available connection signals in the signal library 34. Additionally and/or alternatively, the processor 10 can maintain, update, and/or modify the signal library 34 either automatically, or in response to controls via the user interface. For example, a user may update the signal library 34 to include newly developed connection signals created via the verification tool.

The memory 30 can also include a VIP/signal database 36, which can be or include one or more arrays of connection signals associated with verification graphics and/or verification models and corresponding signals of an integrated circuit device. In some embodiments, the VIP/signal database 36 comprises a listing of pairs of connection signals and integrated circuit device signals that are known to be suitable connections.

In some embodiments the verification tool can come pre-loaded with connection signal/circuit device signal pairs that are known to be suitable connections. Additionally and/or alternatively, the processor 10 can maintain, update, and/or modify the database 36 either automatically, or in response to controls via the user interface. For example, a learning program may update the database 36 to include newly established connection signal/device signal pairs that have been successfully and appropriately added to a graphical environment via the verification tool.

Figure 2:
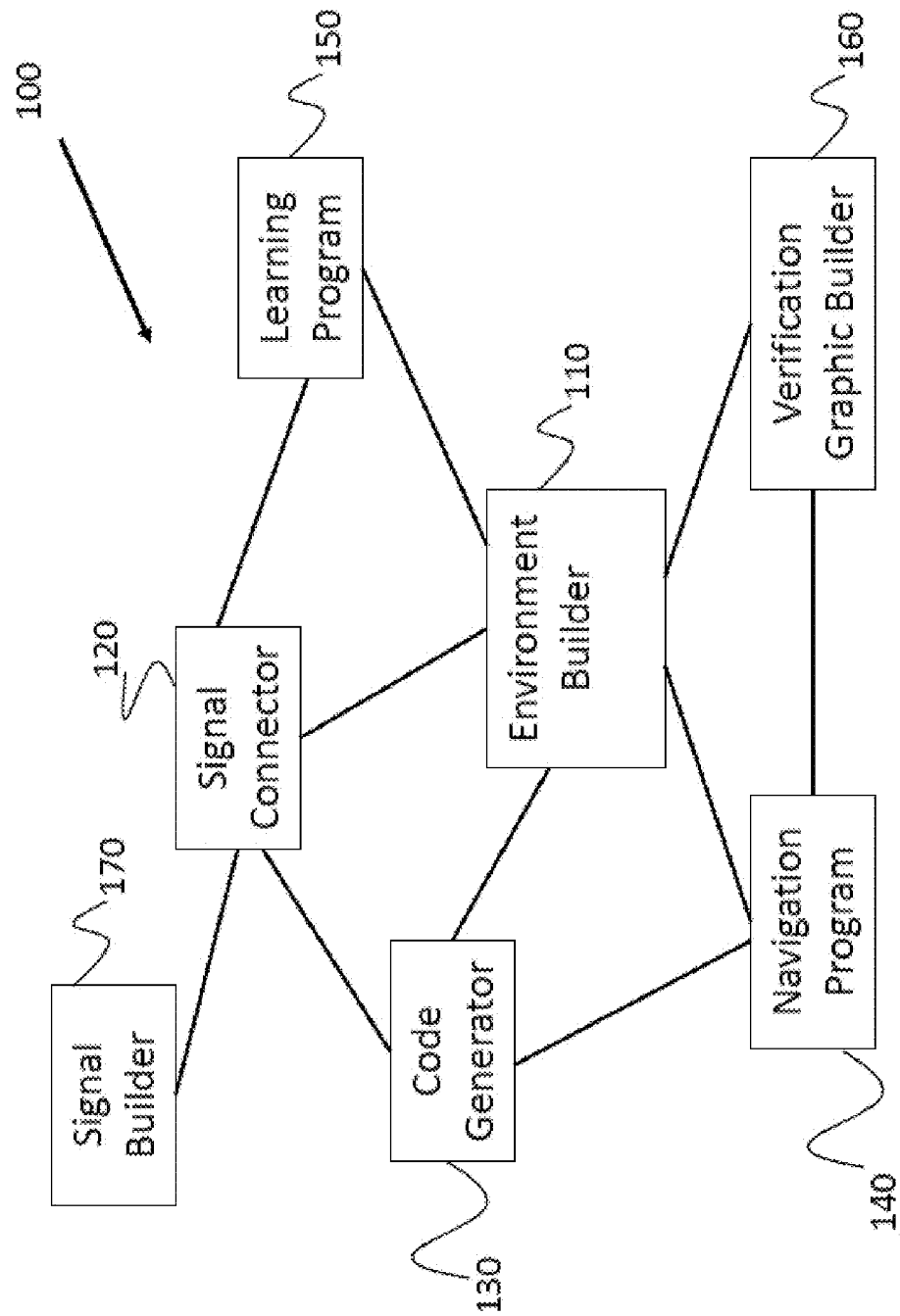
FIG. 2 is a block diagram showing the relationship of program modules operating on a processor in accordance with at least one example of the present disclosure.

FIG. 2 is a block diagram showing the relationship of various circuitry and/or programs associated with the verification tool 100, in accordance with some embodiments. As used throughout this application a "program" or "programs" can refer to circuitry configured to operate in, or in connection with a computer processor or such devices. In some embodiments, the programs and/or circuitry can be implemented as a stand-alone system in communication with one or more of the other circuitry and/or interact with other programming. Further, the programs/circuitry can be implemented through one or more computers, processors, databases, other memory or combinations thereof. In some embodiments, the programs/circuitry can comprise one or more processors having access to processor readable and/or computer readable memory storing programming, code, firmware, executables, data, information or the like, or combinations thereof. The programs can be stored in memory 30 operated or executed, for example, on a processor 10 using the hardware and other components described above with respect to FIG. 1.

The verification tool 100 comprises an environment builder program 110 or circuitry (or environment builder), which allows a user to build a graphical environment representing a design verification environment via a user interface. The environment building program 110 builds a graphical environment for display on the user interface 20. An example of a user interface 20 displaying an exemplary graphical environment 300 capable of generation by the verification tool 100 is presented in FIGS. 6-8.

The graphical environment comprises at least one verification graphic 310, and each verification graphic 310 is representative of a verification module and is associated with source code that executes to simulate the respective verification module interacting with the integrated circuit device under test 320 ("DUT"). The verification module can be, for example, a verification IP ("VIP"). The verification graphic 310 and/or the verification module can be associated with and/or include an interface comprising a series of signals that can interact or connect with signals of the DUT 320.

The environment builder 110 is configured to present and build a design verification environment graphically, using blocks that represent source code that execute to simulate operation of various verification objects. The environment builder 110 allows a user to add verification graphics 310 to a graphical environment 300. The source code associated with the verification graphics 310, when executed by a simulator, can simulate a verification module (e.g., a VIP) interacting with a DUT 320.

The environment builder 110 can present a menu that shows a list, or an array of available verification graphics (an "available verification module array") that a user can add to the graphical verification environment. The environment builder 110 can present the available verification module array on the user interface 20 via a window that is configured to present such an array, for example. From this array, a user may select, via the user interface, one or more verification graphics 310 to add to the graphical environment 300. Thus the user can drag and drop the desired verification graphics 310 to the environment 300. Each verification graphic is associated with source code that represents, or simulates a verification module (e.g., a VIP interface) when executed. The verification module can thus comprise a listing of connection signals that represent signals and interactions with a DUT.

In operation, the environment building program 110 can display the available verification module array via the user interface 20. For example, the environment building program 110 can display a menu presenting a list of verification graphics 310 (each representing a verification module) that can be added to the graphical environment 300. The environment building program 110 also adds verification graphics 310 to the graphical environment in response to receiving a command, such as an add-graphic input signal, from the user interface 20. For example, in response to receiving a command from a user via the user interface to add a graphic from the verification module array, the environment building program 110 will add the selected verification graphic 310 to the graphical environment 300. In some aspects, the selected verification graphic 310 can comprise a listing, or a library, of protocol signals that drive transactions with respect to the DUT 320 in accordance with the verification module corresponding to the selected verification graphic.

In some examples, the verification tool 100 includes a verification graphic building program, or a VIP builder 160 that allows a user to build a new verification graphic 310 that is not represented in the available verification module array. The verification graphic program 160 thus generates a new verification graphic 310 representative of a verification module in response to receiving a command, such as a build-graphic input signal, via the user interface. In some aspects, the environment building program 110 can then add the new verification graphic 310 (representing a verification module) to the graphical environment 300. In some aspects the verification graphic building program 160 will update the available verification module array to include each new verification graphic 310 (representing a verification module) built with the verification graphic building program 160.

Using the verification graphic building program, a user can, for example, define default parameters for the verification graphics, which can help in the future when using the same verification graphic with different signals widths. In some embodiments the user can define the signals in each verification graphic interface (which contains the signals). For example, for each signal the user can: (1) define the signal name, (2) define the signal width, (3) identify the driver (e.g., master or slave), (4) set the initial value, and/or (5) provide a signal description. The user can also define the verification module data items and configuration, which may have fields that are similar to the fields for the verification graphic interface, except the initial values and the driver.

Figure 3:
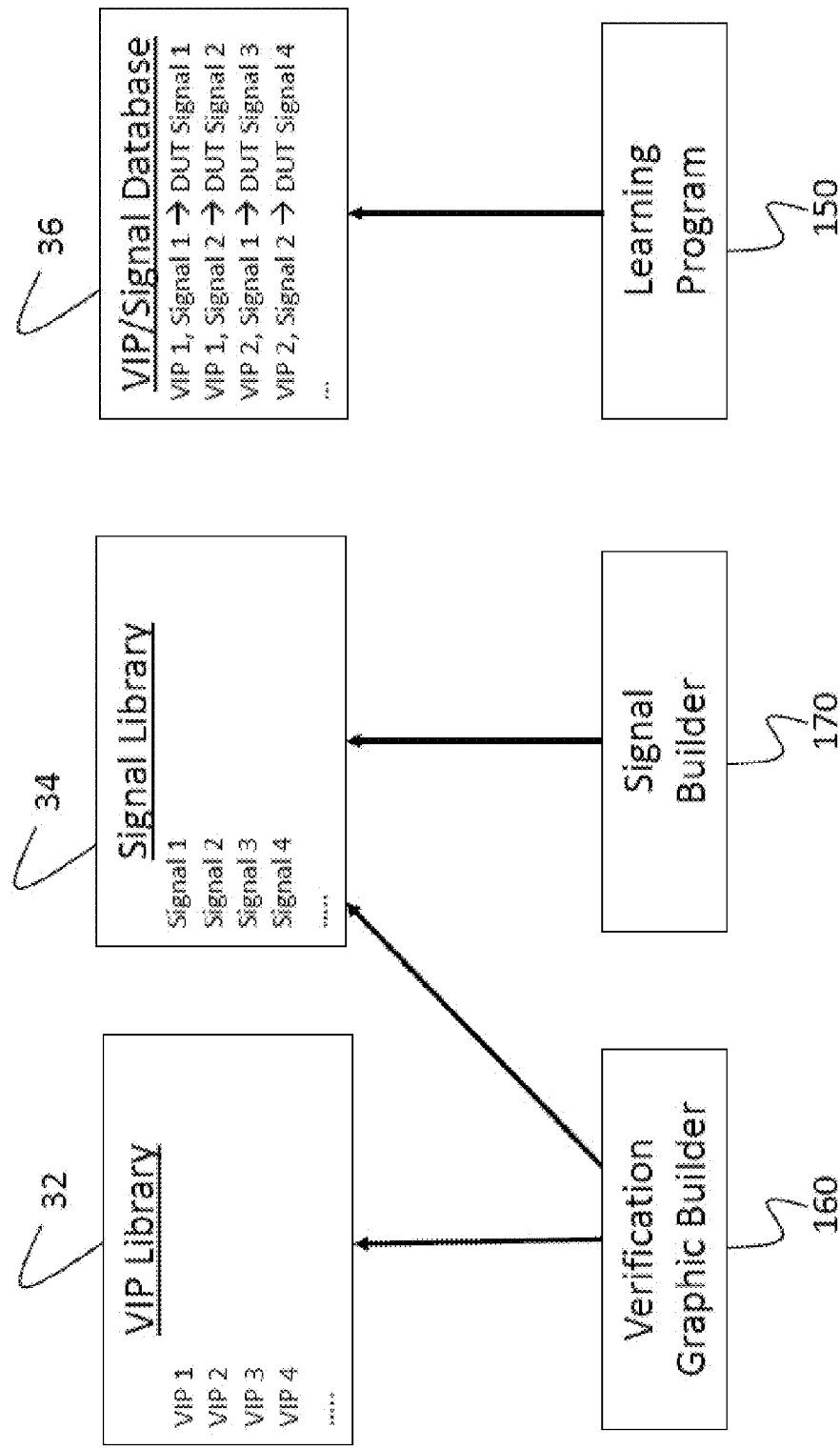
FIG. 3 is a block diagram showing program modules interacting with libraries and/or databases in accordance with at least one example of the present disclosure.

FIG. 3 is a block diagram showing the verification graphic builder 160 interacting with the VIP library 32 maintained on the computer memory 30. Once a verification graphic (representing a verification module) is built via the verification graphic builder 160, the graphic can then be added to the VIP library 32 so that the graphic can be added later to other graphical environments. In some embodiments, the verification graphic builder 160 can allow a user to access, edit, delete, or otherwise modify the verification graphics stored within the VIP library 32.

Referring again to FIG. 2, the verification tool 100 also comprises a signal connector program 120, or a signal connector that assigns connection signals to verification graphics in the graphical environment to corresponding signals of the DUT. The connection signals are associated with source code that when implemented simulate a connection between one or more of the verification modules represented by the verification graphics added to the environment and the DUT. For example, the signal connector program acts to connect or correlate the signals of one or more verification modules and signals of the DUT. For example, the signal connector program 120 can generate connection signals that connect protocol signals of the verification modules represented by the verification graphics with signals of the DUT.

In some examples, the signal connector program 120 selects one or more connection signals for each verification graphic 310 in the graphical environment 300 from an array of available connection signals. The array of available connection signals can be maintained and/or stored, for example, in the signal library 34 of the memory 30.

In some embodiments, the signal library 34 is an interface (e.g., a VIP interface), identifying the signals suitable for connecting a particular verification module (e.g., a VIP) to a DUT. For example, each verification graphic 310 can represent a verification module (e.g., a VIP) that comprises an array of available connection signals, and the signal connector program selects one or more of these signals to simulate a connection between the verification module and the DUT 320.

The signal library 34 can comprise a plurality of available connection signal arrays, or it can contain a single array, each array comprising at least one available connection signal The signal connector program 120 can then assign the selected signal as the connection signal between the verification graphic and the DUT. In some embodiments, the signal connector program 120 selects at least one connection signal from the array of available connection signals based on the receipt of a command, such as a selection input signal, received via the user interface 20. For example, a user may select a particular signal from a menu that presents the array of available connection signals.

In some embodiments, the verification tool 100 includes a signal builder program 170 that allows a user to add verification signals to the interface for each verification module. For example, the signal builder program 170 can provide an interface that allows a user to add connection signals to an array of available connection signals for one or more verification modules represented by a verification graphic. FIG. 3 shows the signal builder 170 interacting with the signal library 34 maintained on the computer memory 30. Once a connection signal is created, edited, modified, etc. via the signal builder 170, the connection signal can then be added to the signal library 34 so that the signal can connect verification graphics (or VIPs) to a DUT in later created graphical environments.

In some embodiments, the signal builder 170 can allow a user to access, edit, delete, or otherwise modify the connection signals stored within the signal library 34. In some embodiments, the signal builder program can be a part of, or in communication with the verification graphic builder program 160. That is, the signal builder program 170 can facilitate the building of new verification graphics by allowing a user to build, select, combine, or otherwise add connection signals to the interface of the verification modules represented by verification graphics available to add to the graphical environment.

Referring again to FIG. 2, the verification tool 100 can also include a code generating program 130, or a code generator, that generates test simulation code. The test simulation code can be executed by a simulator, for example, to simulate operation of the DUT within an environment represented by the graphical environment. The code generating program 130 generates a test simulation code in response to receiving a command, such as a generation input signal, via the user interface 20. The test simulation code is based at least in part on the source code associated with each verification graphic of the graphical environment and the source code associated with each connection signal assigned by the signal connector program 120. The test simulation code can be generated in a format that can be executed on a simulator that simulates testing of the integrated circuit device.

In some aspects, the verification tool 100 also includes a learning program 150. The learning program 150 maintains a VIP/signal database 36 of connection signals that are acceptable to connect certain verification graphics with the DUT. FIG. 3 shows the learning program 150 interacting with the VIP/signal database 36 maintained on the computer memory 30. The learning program 150 updates the database 36 in response to each assignment of a connection signal to a verification graphic. For example, once a suitable connection signal is assigned to connect a verification graphic to the DUT, the learning program 150 updates the database 36 so that it includes the pairs of the verification graphic connection signals and DUT signals.

The learning program 150 is also configured to recommend a connection signal for each verification graphic added to the graphical environment. The recommendation is based on the information in the database 36 and the particular verification graphic and corresponding DUT. For example, the learning program 150 can generate a recommended connection signal by consulting the database 36 and recognizing a connection between the particular signal of the verification graphic and a DUT in a previously generated environment.

In some embodiments, the learning program 150 and/or the signal connector program 120 displays the recommended connection signal for selection via the user interface. For example, the learning program 150 can display one or more recommended connection signal to a user, or highlight the recommended connection signal(s) among a list of connection signals, signifying a recommendation for a user to select the signal for assignment to the verification graphic. The signal connector program 120 can then select one or more connection signal for each verification graphic from the array of available connection signals in the signal library 34 based on a command received via the user interface 20. For example, the signal connector program 120 can assign a recommended connection signal in response to the user interface 20 transmitting a selection input signal, which can be generated in response to a user clicking on a particular object via the user interface 20. Additionally and/or alternatively, the signal connector program 120 can be configured to automatically select a recommended connection signal for at least one verification graphic.

Figure 4:
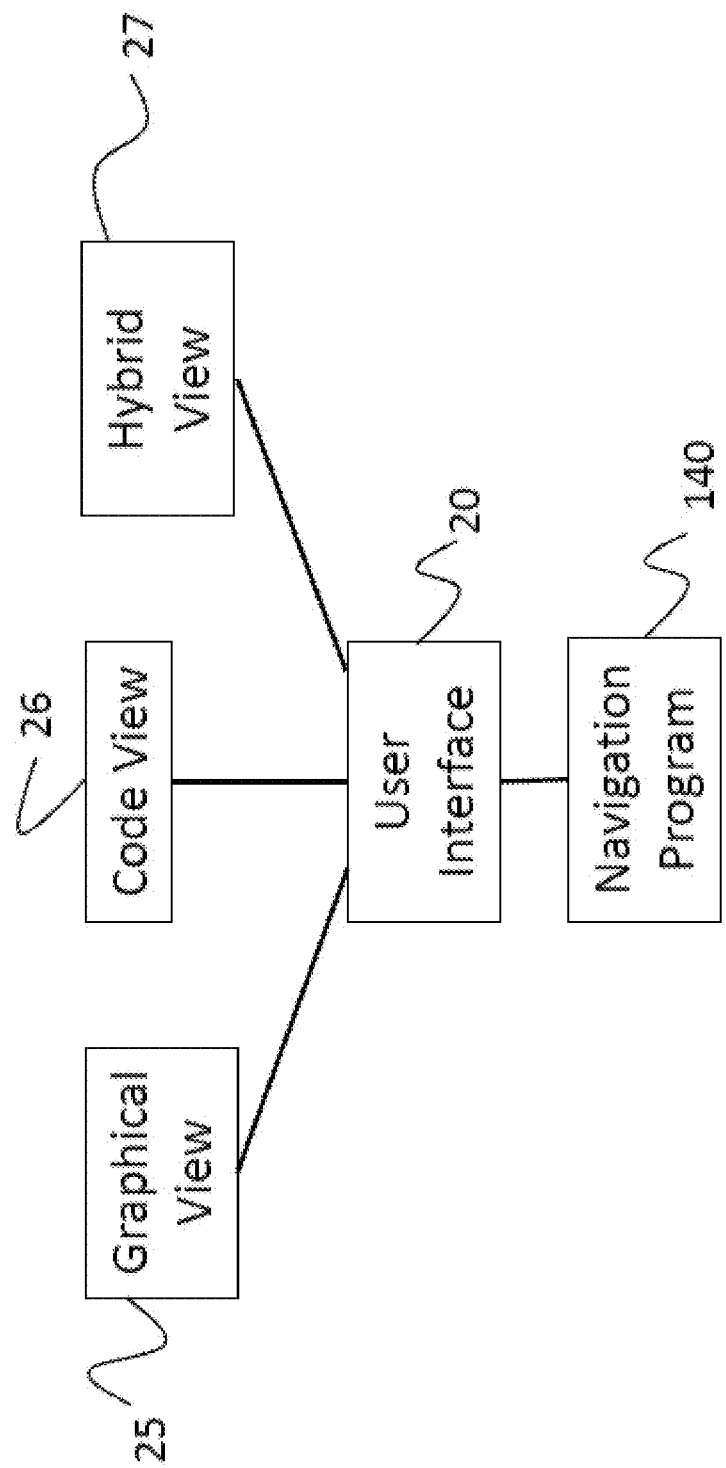
FIG. 4 is a block diagram showing the interaction of a navigation program with a user interface in accordance with at least one embodiment of the present disclosure.

Referring again to FIG. 2, the verification tool 100 can also be configured to execute a navigation program 140 that facilitates interaction with at least the environment building program 110, the signal connector program 120 (connection not shown), the verification graphic builder program 120 and the code generating program 130 via the user interface 20. FIG. 4 is a block diagram demonstrating operation of a navigation program 140 in relation to the user interface 20. The navigation program 140 can be configured to control the display of the source code associated with the graphical environment via the user interface 20 in response to receiving a command, such as a display control input signal generated by a user via the user interface 20. For example, a user can toggle back and forth between a graphical view 25 that displays the graphical environment on the user interface, and a code view 26 that displays the source code associated with the graphical environment. In some embodiments, the user can also elect a hybrid 27 view that displays both graphical components of the environment and source code.

In some aspects, the navigation program 140 is also configured to control the level of detail of the graphical environment displayed via the user interface 20. For example, in response to receiving a command, such as a detail control input signal generated by a user via the user interface, the navigation program 140 can allow a user to zoom in to view more detail regarding the makeup of the components and modules added to the graphical environment, and also to zoom out for a high-level view of the graphical environment.

In some embodiments, the navigation program 140 can allow for an integrated editor (e.g., within the verification tool) to open and/or access the source code. Additionally and/or alternatively, the navigation program can allow the source code to be opened and/or accessed via an external editor as defined in the user preferences. In this manner, the user can have the ability to open a source file by selecting a specific file in the project view (e.g., in the right pane), or by double clicking on a graphical component or property.

Further, the navigation program 140 and/or other components of the verification tool can present information to a user in other manners. For example, hovering a mouse cursor over a module or property can initiate a pop-up window that displays a snippet of code associated with the module or property (a property can be, for example, a task, a function, or the like). In some embodiments, the navigation program 140 can highlight connections that provide more graphical information to the user when navigating through the program. For example, the navigation program can present a user with a clocks-tree, which can present information pertaining to which clocks are connected to which verification modules, interfaces, content, etc.

In some embodiments, the navigation program 140 can be configured so that a single click over a component will list (e.g., graphically) some or all of the properties of the component, including, for example, the variables, tasks, functions associated with the component. In some examples, the verification tool and/or the navigation program 140 can allow a user to update these properties from the same view without having to open the source code. In still further examples, the verification tool can back annotate updates to the source code so that the changes will also be reflected in the user interface.

Figure 5:
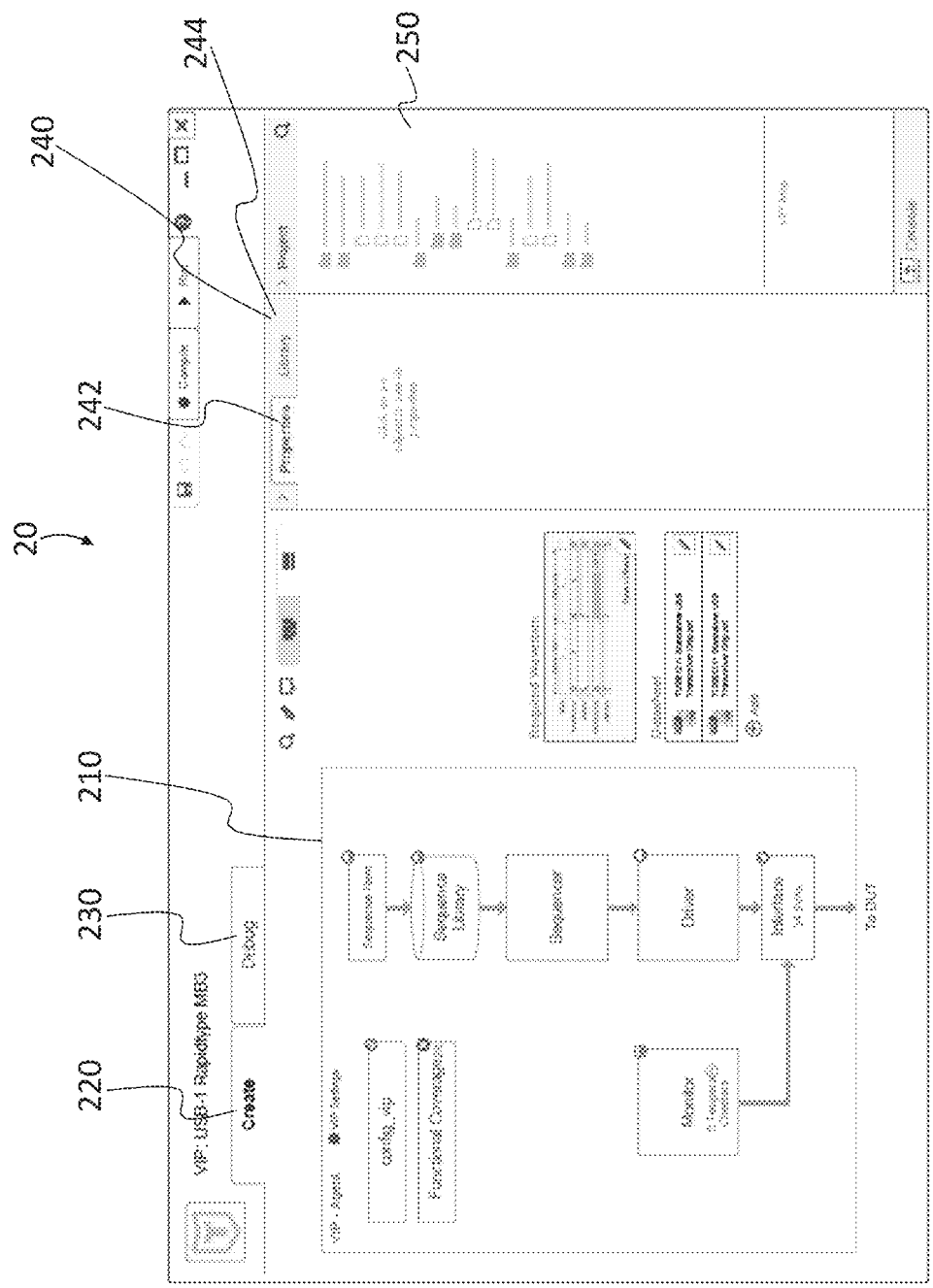
FIG. 5 is an example of a screen shot presenting a user interface displaying internal components of a verification graphic in accordance with at least one example of the present disclosure.

FIGS. 5-14 show screen shots of the verification tool 100 operating on a user interface 20 of a computer in accordance with embodiments of the present disclosure. FIG. 5 is an example of a screen shot presenting a user interface 20 operating a verification graphic builder program 160 of the verification tool 100. The user interface 20 displays internal components of a verification graphic 210 (e.g., a VIP). Via the user interface 20, a user is allowed to add properties, signals, and other features to the verification graphic 210, which can represent a verification module (e.g., a VIP), and be added to the graphical environment via the environment builder program 110 of the verification tool 100.

The user interface 20 includes a create tab 220, which allows a user to build, edit, modify, delete, or otherwise configure various verification graphics 210. The user interface 20 also includes a debug tab 230 which can present a user with another interface that allows for debugging of particular aspects of the verification graphic 210. In some embodiments, the user interface 20 can also include a documentation tab which can present the project documentation when selected by a user. The project documentation can be displayed in HTML format, for example. The documentation can be generated by the verification tool upon the generation of a verification graphic or a graphical environment, for example.

The interface can include a modular window 240 that includes properties tab 242 and a library tab 244. The properties tab 242 allows a user to view, add, and edit various features of the verification graphic 210, and the library tab 244 allows the user to view and access the signal library 34 and/or a VIP library 32 and access signals and other features to add to the graphical environment.

The user interface 20 can also include a project window 250, which provides an overall outline of the graphical environment project. Via the project window 250, the user interface 200 provides access to the navigation program 140, thereby allowing the user to view various portions of the graphical environment in greater or less detail, and to select a mode by which the environment is viewed (e.g., in a graphical view 25, code view 26, hybrid view 27, or the like).

Figure 6:
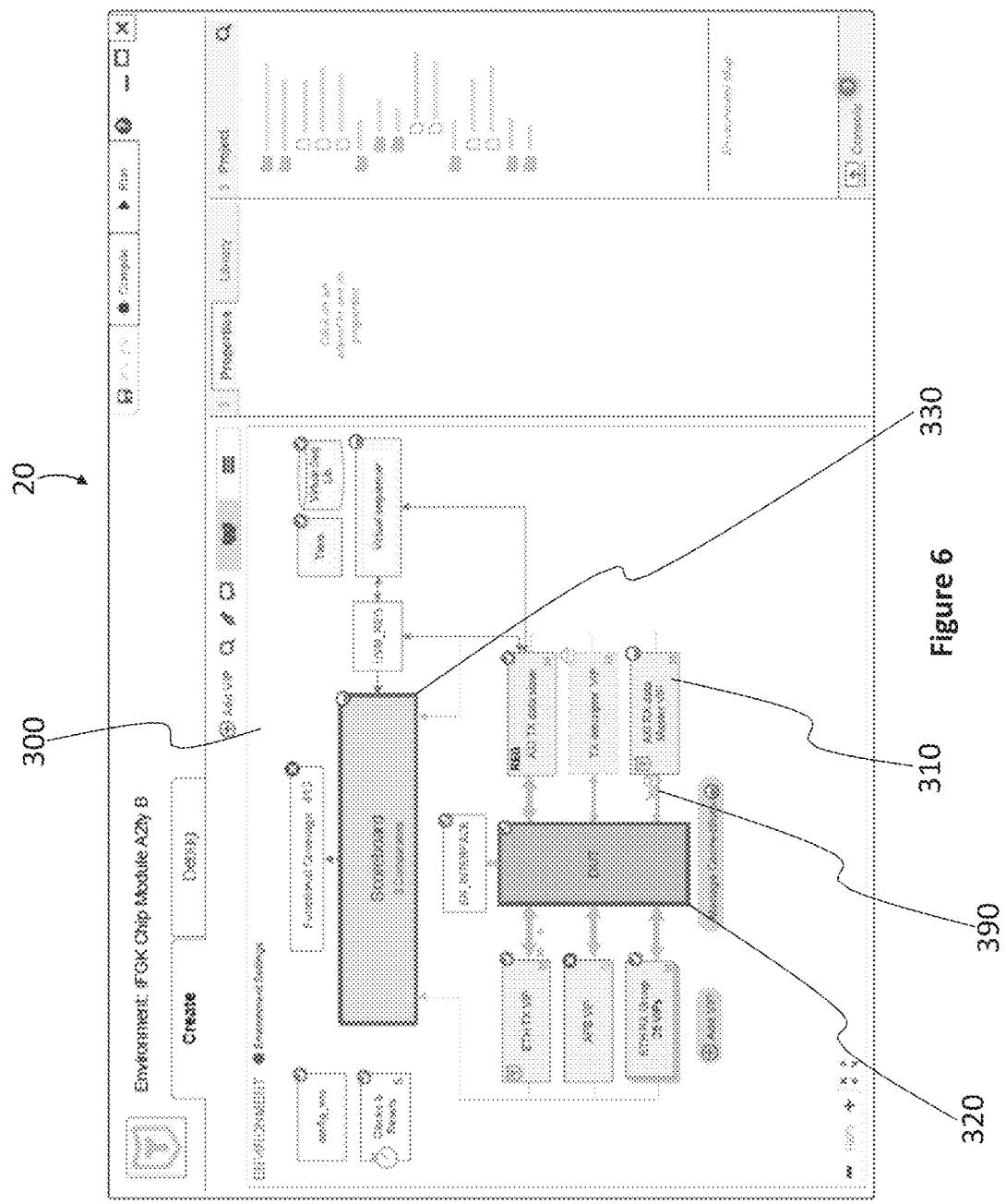
FIG. 6 is an example of a screen shot presenting a user interface displaying a graphical verification environment in accordance with at least one example of the present disclosure.

FIG. 6 is an example of a screen shot presenting a user interface 20 operating the verification tool 100 to display an exemplary graphical verification environment 300 in accordance with embodiments of the verification tool 100. The graphical environment 300 comprises multiple modules, including several verification graphics 310, which can be, for example VIPs that have an interface comprising signals. The verification graphics 310 can each be associated with source code that is configured to execute on a simulator, and, when executed, simulates the interaction of a verification module (e.g., a VIP) with the DUT 320.

The graphical environment 300 also includes a DUT 320, which can represent an integrated circuit device intended to be used in testing. The DUT 320 is connected to multiple verification graphics 310 via connections 390. The connections 390 can be assigned by the signal connector program 120 of the verification tool 100. Via the user interface 20, a user can click on an arrow representing a connection 390 and be presented with a menu, window, or other interface that allows the user to select and assign connection signals that connect the signals of the verification graphics 210 with the DUT 320. The graphical environment 300 also includes a scoreboard 330, which can be a reference model that monitors bus activity of the verification modules.

Figure 7:
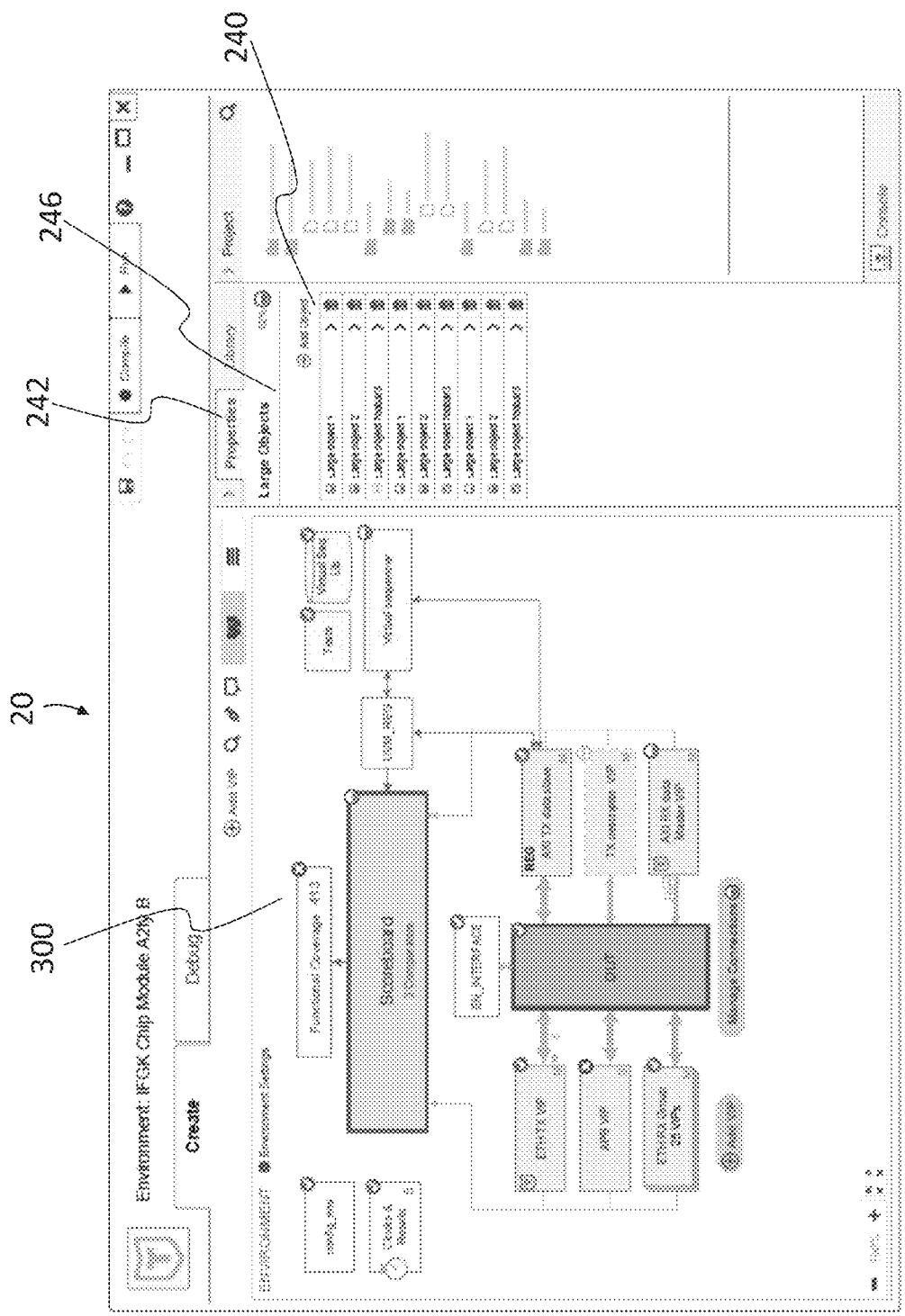
FIG. 7 is an example of a screen shot presenting a user interface displaying a graphical verification environment and a large objects viewing window in accordance with at least one example of the present disclosure.

FIG. 7 is another screen shot of the user interface 20 operating the verification tool 100 to display an exemplary graphical verification environment 300 and a large objects viewing display 246 in the properties tab 242. The large objects viewing display 246 allows a user to drill down into large objects (e.g., verification graphics, environments, a DUT, a scoreboard, etc.) in the graphical environment 300. A user can drill down into large objects either for purposes of viewing the objects or to edit/modify the objects. The user can drill down by selecting the object in the display 246 with a mouse, which selection can cause the object to display in a new window expanding from the modular window 240.

Figure 8:
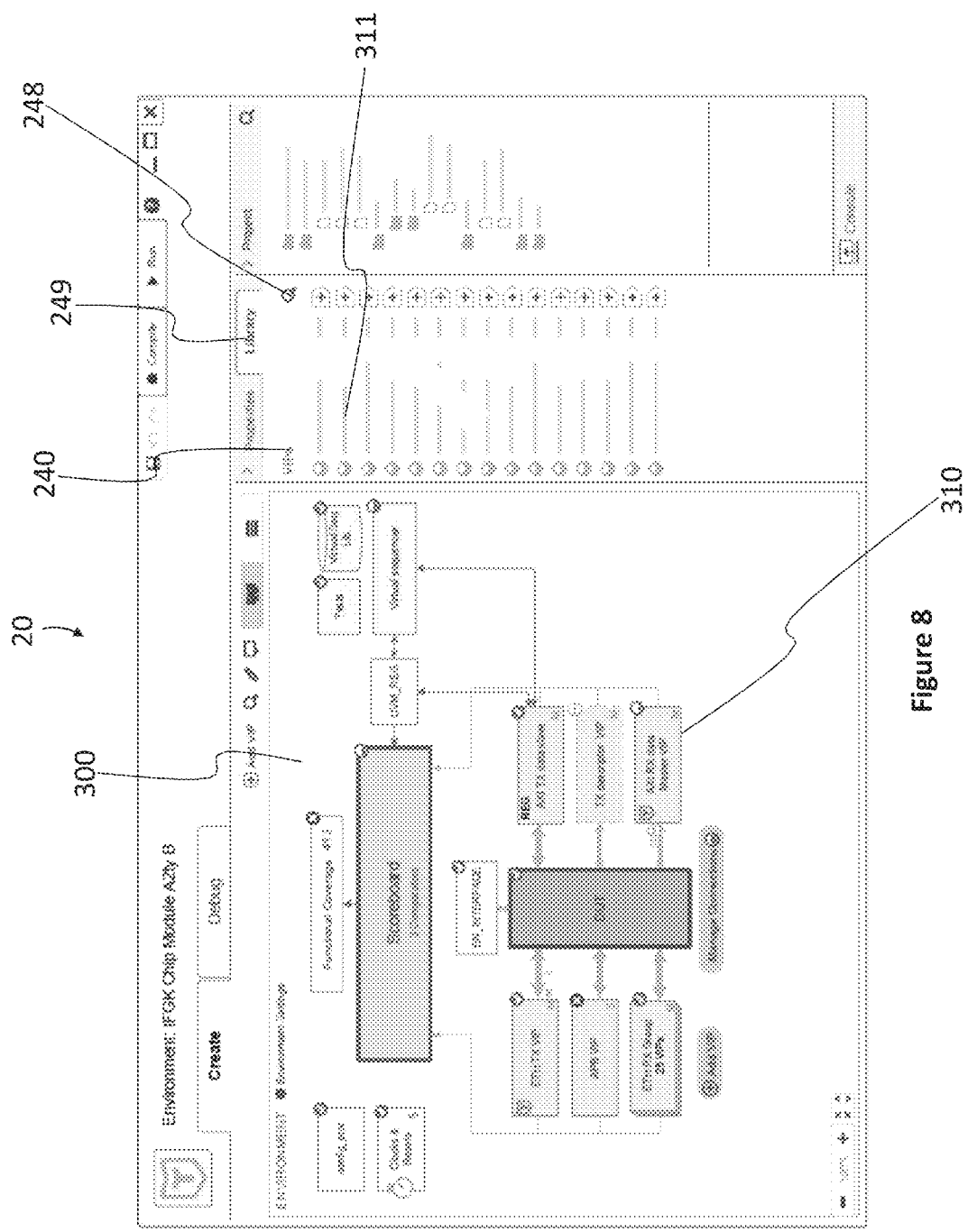
FIG. 8 is an example of a screen shot presenting a user interface displaying a graphical verification environment and a library viewing window in accordance with at least one example of the present disclosure.

FIG. 8 is a screen shot of a user interface 20 operating the verification tool 100 to display an exemplary graphical verification environment 300 in which the library tab 244 selected to display a library viewing window 248. The library viewing window 248 can provide an interface allowing a user to access the VIP library 32, the signal library 34, the VIP/signal database 36, or other libraries and/or databases. In this manner the user can select verification graphics from a list of graphic names 311 to add to the graphical environment 300.

Figure 9:
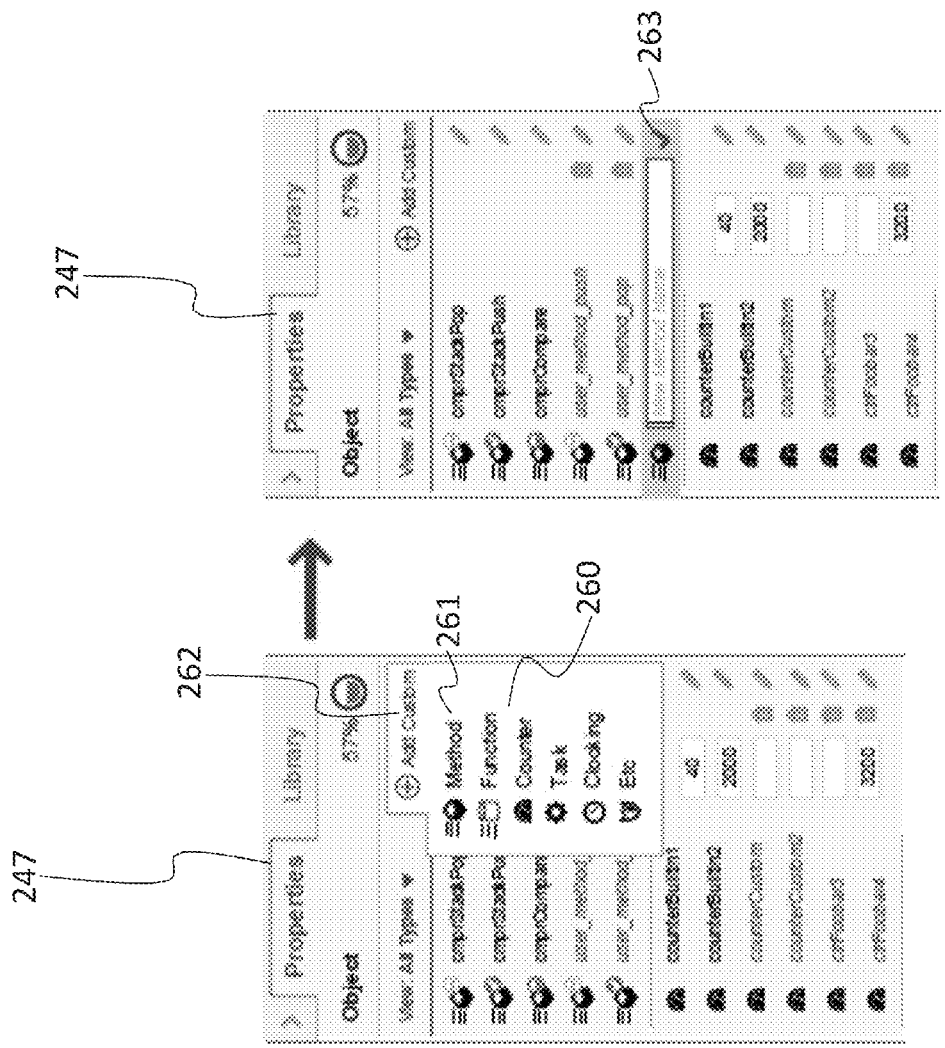
FIG. 9 shows example menus for adding custom code that are accessible on a user interface in accordance with at least one example of the present disclosure.

FIG. 9 shows configurations of an object display 247 that can be accessible, for example, via the properties tab 242 of the window module 240 of the user interface 20. The object display 247 provides a menu that allows a user to add custom code to the design verification environment.

In some embodiments, the user can access an add custom menu 260, which will allow the user to add objects to the object display 247. To modify custom code, a user can click on the add custom icon 262 and select the method item 261, This selection will add a new method 263 to the object display 247. Likewise, a user can add a function, a counter, a task, clocking blocks, or other functionality to the object window, each of which can be used to add, or modify the graphical environment 300 via the user interface 20. The new method 263 can comprise custom source code that can be entered by the user. The source code can be executed to simulate a number of features relating to design verification environments, including but not limited to VIPs, connection signals, DUT signals, scoreboards, or the like.

Figure 10:
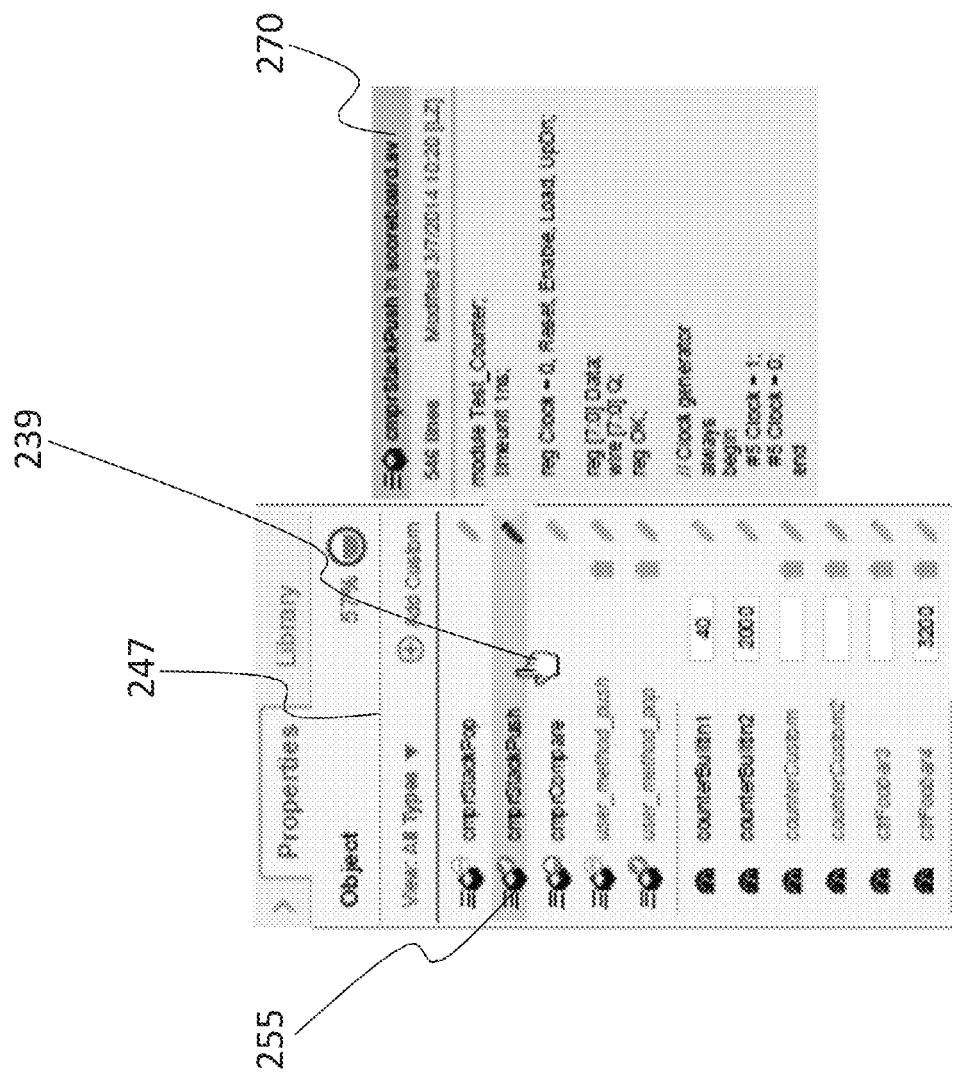
FIG. 10 shows example of a user interface that allows for viewing source code associated with a particular object associated with the graphical verification environment in accordance with at least one example of the present disclosure.

FIG. 10 illustrates another feature of the object display 247 presented by the user interface 20. In FIG. 10, a cursor 239 hovers over an object 255 in the object display 247. This process causes a code preview window 270 to display to the right of the object 255. The code preview window 270 shows the source code associated with the object. In this manner a user can review the source code associated with objects.

Figure 11:
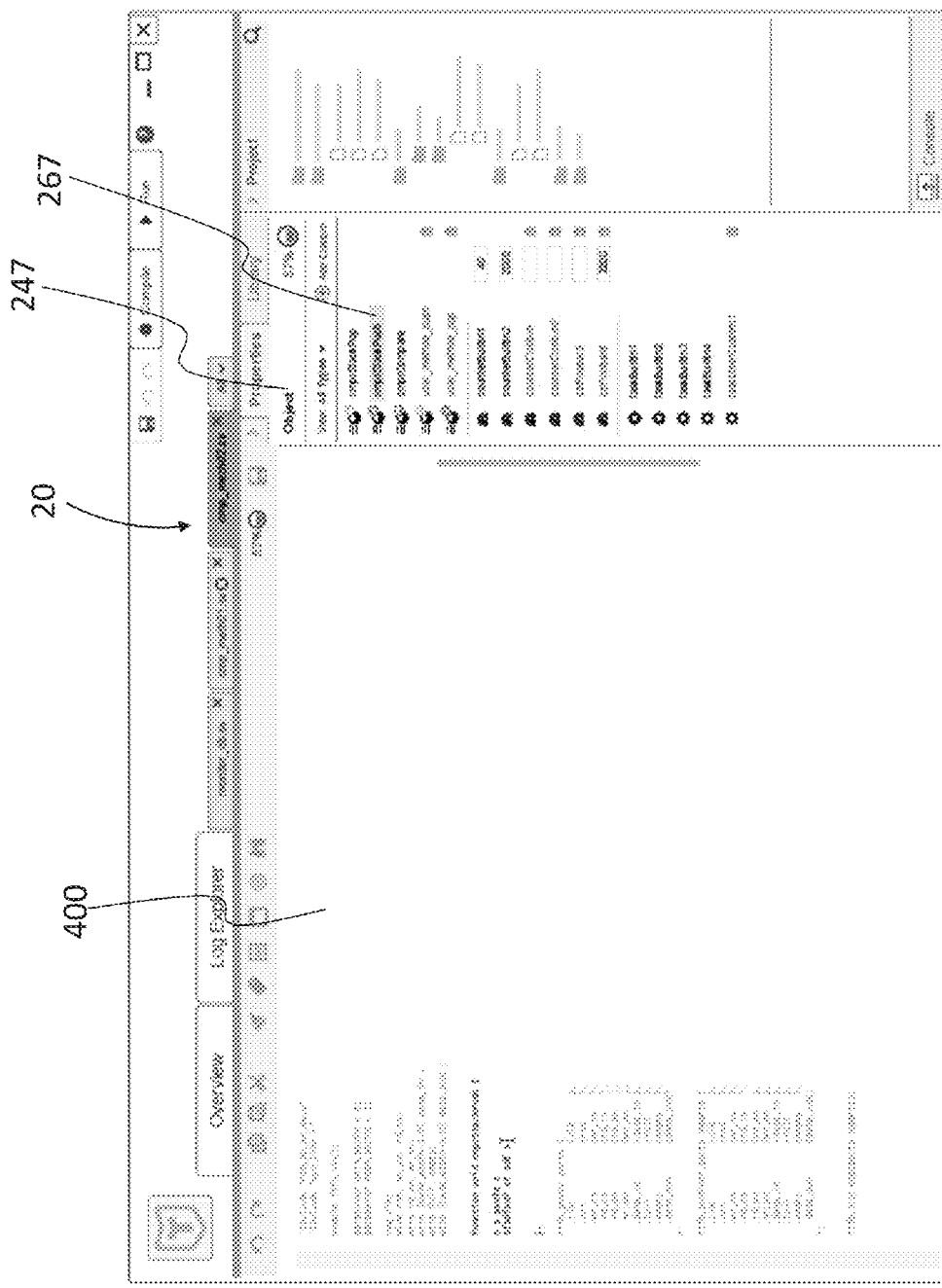
FIG. 11 is an example of a screen shot presenting a user interface that allows interaction with a code editing function in accordance with at least one example of the present disclosure.

In some embodiments, a user may be able to step into and add, modify, or delete source code via a code editing platform. For example, FIG. 11 is a screen shot of the user interface 20 operating a code editing feature 400 of the verification tool 100. In the context of the code editing feature 400, the verification tool 100 displays the properties tab 242, which shows the entities extracted from the currently edited file. The selected entry 267 of the object display 247 is highlighted. When a user selects an entry (e.g., by clicking on that entry with a mouse) the verification tool 100 can automatically display the code associated with that entry in the code editor 400. In this manner a user will then be able to edit, add, delete, or otherwise modify the code associated with that entry.

In some embodiments, the user can change or modify the source code using the code editing feature 400, or through an external editor program, for example. In this manner, the verification tool can parse and present changes that are opposed by the user in the source code via the user interface. In some aspects, the verification tool can include a linter that can validate, verify, and/or debug any code that the user adds in this manner.

Figure 12:
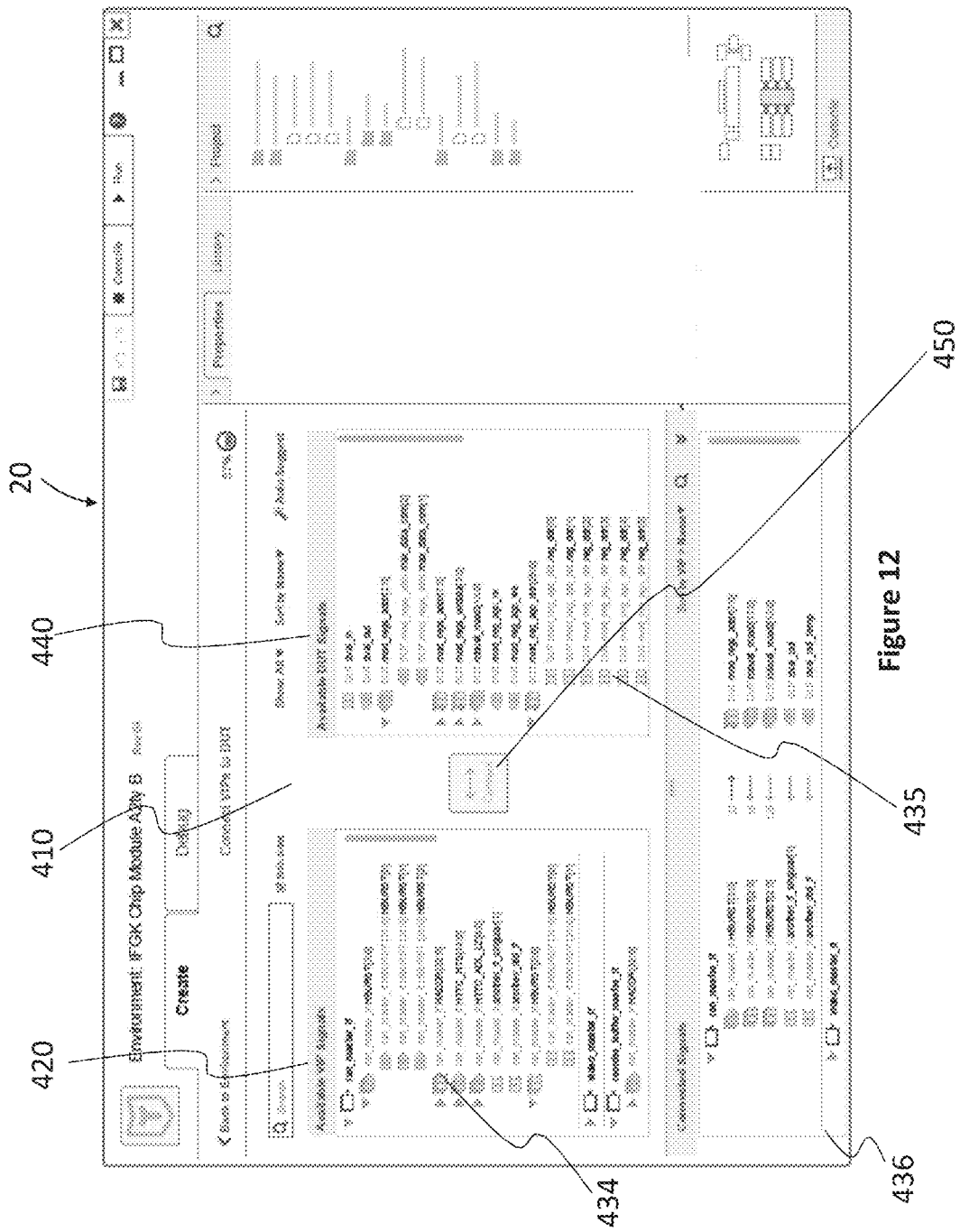
FIG. 12 is an example of a screen shot presenting a user interface that allows a user to connect verification signals with DUT signals in accordance with at least one example of the present disclosure.

FIG. 12 is a screen shot of a user interface 20 operating the signal connector program 120 of the verification tool 100. The user interface 20 comprises a connection display 410, which shows an array of available connection signals 434 in a VIP signal window 420, and an array of available DUT signals 435 in a DUT window 440. The signals displayed in the VIP signal window 420 can be associated with verification graphics 310 added to the graphical environment 300. The signals can be, for example, the signals stored in the signal library 34 associated with that particular verification graphic 310. A user can select a signal from the VIP signal window 420 and a corresponding signal from the DUT window 440, and assign, or pair the signals with one another, by clicking on the connect button 450.

Figure 13:
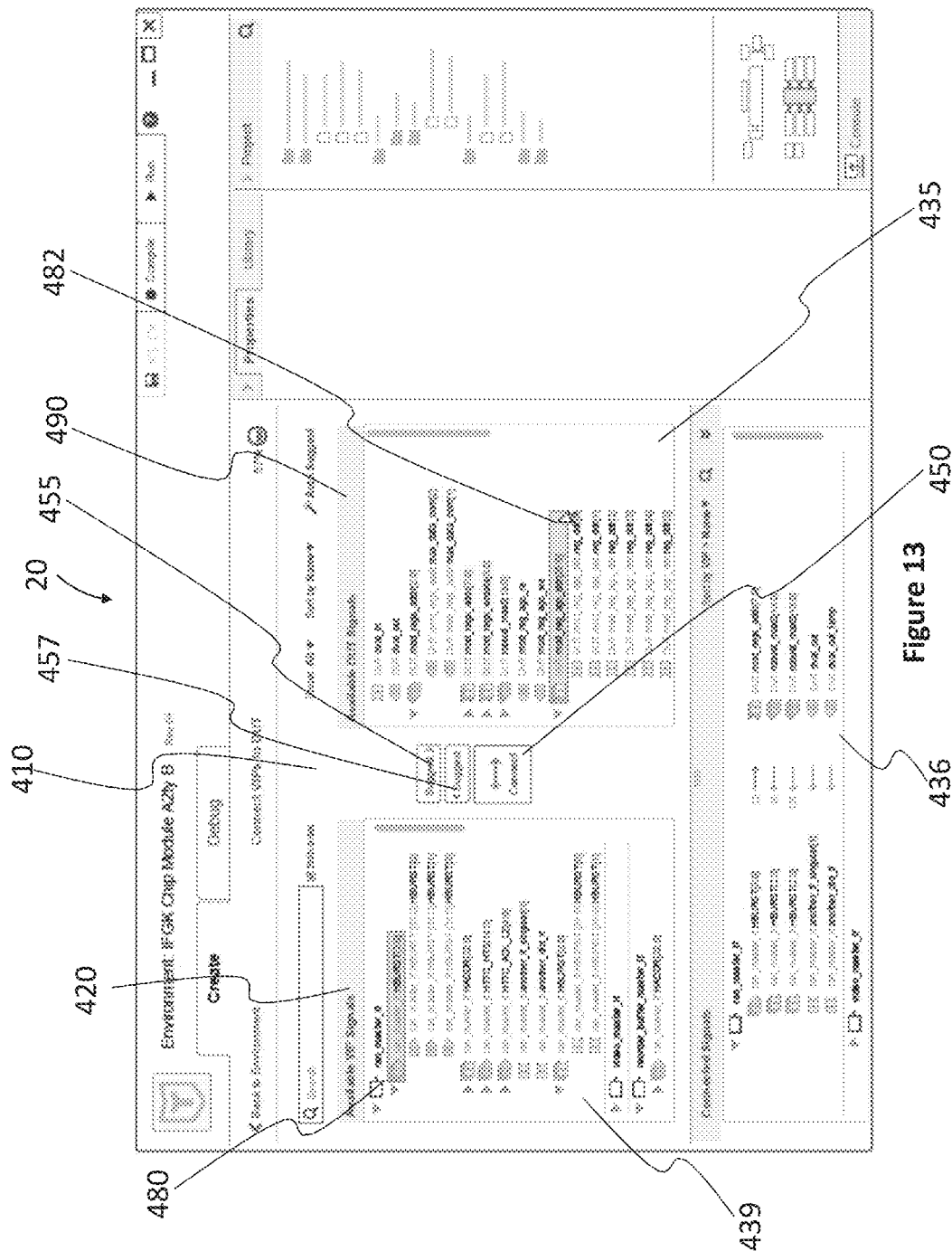
FIG. 13 shows the screen shot of FIG. 12 with certain recommended DUT signals highlighted in accordance with at least one example of the present disclosure.

In some embodiments, the learning program 150 will recommend signals to pair with one another and display the recommended signals via the user interface 20. The recommendation can be based, for example, on information stored in a database that identifies pairs of signals that have been connected in previously built environments. FIG. 13 shows the screen shot of FIG. 12 with certain recommended DUT signals highlighted. For example, upon selecting a signal from the VIP signal window, the learning program may highlight one or more signals from the DUT window 440, the highlighted signals representing recommended signals.

In some aspects, the learning program 150 can highlight the recommended signals automatically. Alternatively, the learning program 150 can highlight the recommended signals in response to an instruction from a user via the user interface 20. For example, the user can select a VIP connection signal 480 and click on the first suggest button 455 to highlight the recommended DUT signal(s) 482 corresponding to the selected VIP connection signal 480. Likewise, a user can select a DUT signal 482, and click on the second suggest button 457 to highlight the recommended VIP connection signal.

The learning program 150 can recommend the signals based on information in the VIP/signal database 36 relating to signals that were previously successfully assigned to one another or by pattern matching, for example. Connected signal window 436 can display the VIP/signal database 36, thus displaying pairs of signals that are currently applied. In some embodiments, the learning program 150 can automatically assign and/or pair the signals without requiring feedback from a user.

Figure 14:
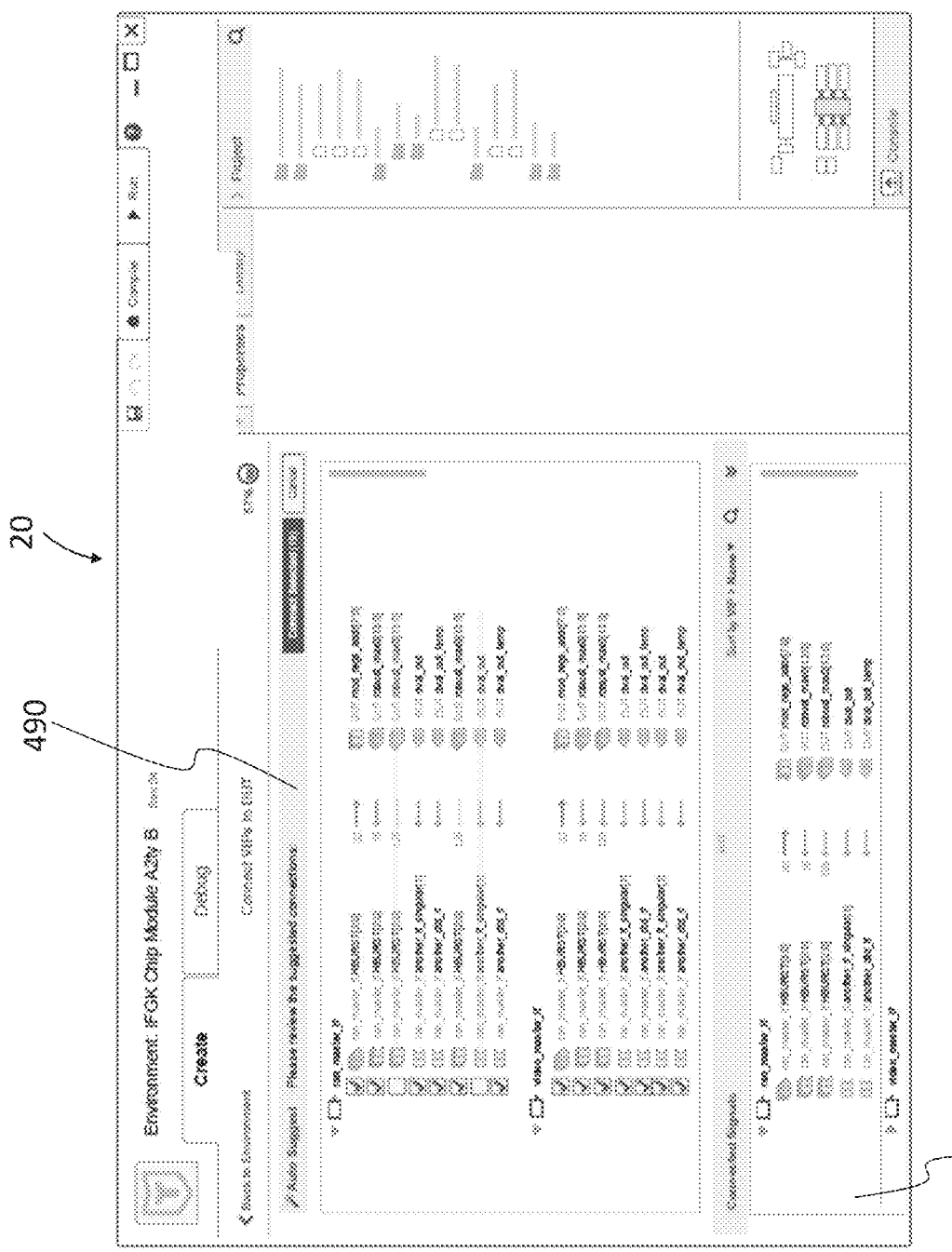
FIG. 14 is an example of a screen shot presenting a user interface that allows a user to apply all previously suggested connection signals to the graphical environment in accordance with at least one example of the present disclosure.

FIG. 14 is a screen shot of a user interface 20 operating the verification tool 100 to view the signal pairs that are currently applied to a graphical environment 300. An auto signal interface window 490 allows a user to review the suggested connections, and allows a user to check or uncheck all suggestions recommended by the learning program 150 and apply them to the graphical environment. In this view a user is able to see all the suggested connections recommended by the learning program 150 as they pertain to the graphical environment under construction. The user can choose to apply, or refuse the recommended connections via this interface.

Certain embodiments of the present disclosure also present methods for coding a verification environment that can be used to simulate testing on an integrated circuit DUT. The methods can be carried out by a computer, or a computer processor executing the programs of the verification tool 100. The computer carrying out the method can have a memory, a processor, and a user interface. In some examples, the method can be carried out by the computer and/or the computer processor executing the programs described above.

Figure 15:
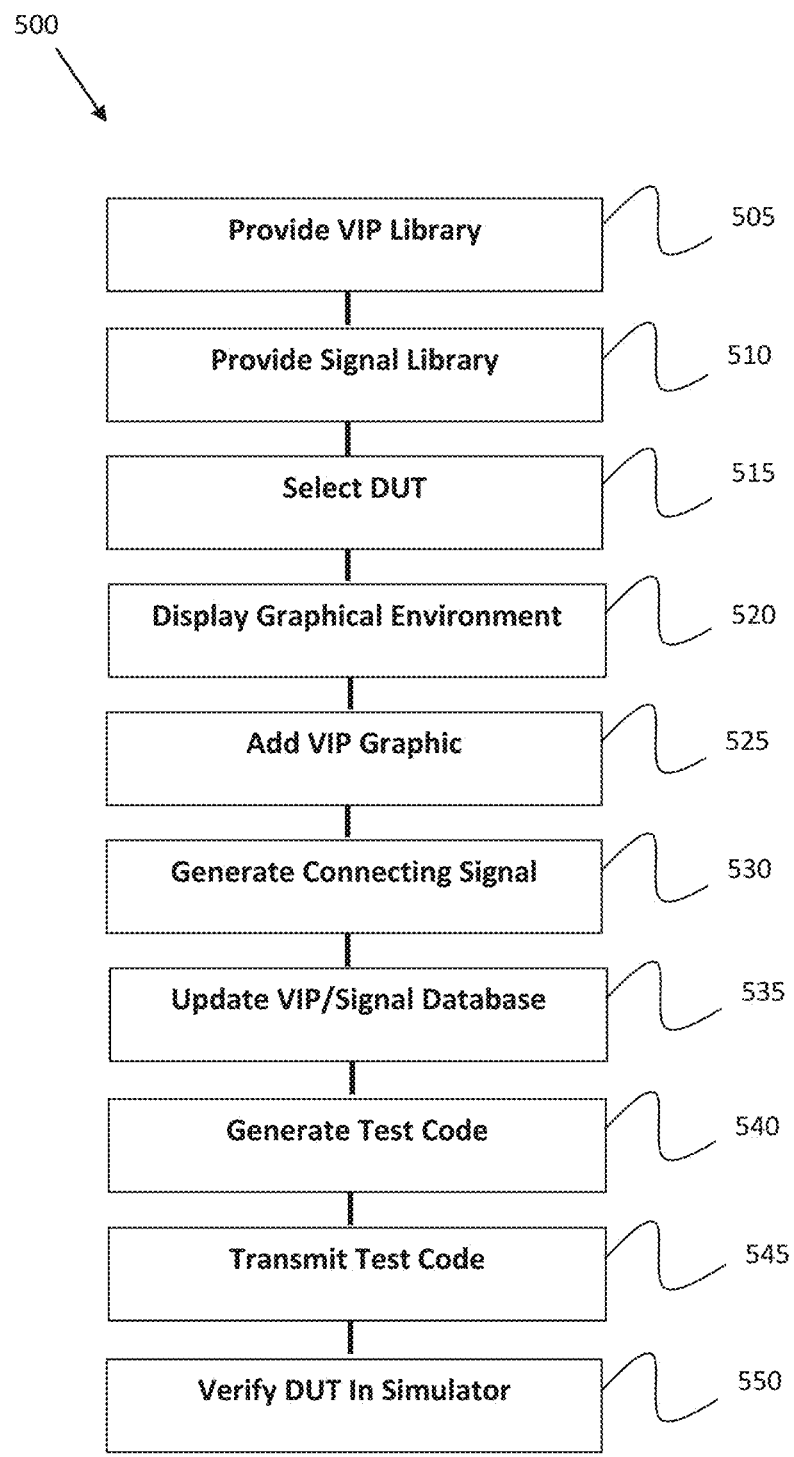
FIG. 15 is a flow diagram of a method for coding a verification environment in accordance with at least one embodiment of the present disclosure.

FIG. 15 is a flow diagram of a method 500 for coding a verification environment. The method 500 includes the steps of providing a VIP library 505 and providing a signal library 510. The VIP library can be an array of available verification graphics that can be added to a graphical environment. The signal library can be an array of available connection signals that represent interaction of a verification module with a DUT. In some embodiments, the signal library includes an array of available connection signals for each verification graphic added to the graphical environment.

In some embodiments, steps 505 and 510 can further include maintaining, updating, modifying, adding to, or deleting from the VIP and/or signal library. The VIP library and the signal library can be maintained, for example, on a memory device that communicates with the computer and/or the computer processor. In some embodiments, steps 505 and/or 510 can be done automatically by a verification tool, such as the verification tool described herein. For example, the verification tool can parse the interface and update, modify, and/or maintain the VIP/signal libraries as a user adds a verification graphic to the environment. The method 500 can also include maintaining a VIP/signal database that keeps a log of connection signals that have been applied to connect certain verification graphics to certain DUTs in previously prepared graphical environments.

At step 515 a DUT is added to the graphical environment. The DUT represents an integrated circuit device to be tested by a simulation program according to the parameters established by the graphical environment. The DUT can be represented by a device graphic displayed on the user interface.

Step 520 involves displaying a graphical environment model on a user interface in response to receiving a command, such as an input signal via the user interface. The graphical environment model can include the device graphic representing the DUT selected in step 515.

At step 525, a verification graphic (e.g., a VIP graphic) is added to and displayed via the graphical environment model. The verification graphic can be added in response to receiving a command, such as an add-graphic input signal, via the user interface. In some embodiments, the verification graphic added is selected from the array of available verification graphics maintained in the VIP library. In other embodiments, the verification graphic added is new and is created using a verification building program. The verification graphic added to the graphical environment model is associated with source code that simulates a verification model interacting with the integrated circuit device upon execution.

At step 530, the method 500 assigns at least one connection signal to each verification graphic in the graphical environment. Each connection signal is associated with source code that simulates as connection between the verification model and the integrated circuit device upon execution. The connection signal can be selected from an array of available connection signals maintained in the signal library. In some embodiments a learning program recommends connection signals for connecting to the DUT. Further, in some embodiments, the learning program automatically assigns a connection signal to a verification graphic without receiving feedback or input from a user.

At step 535, the method 500 can involve updating the VIP/signal database with the connections signals that were applied in step 530. In this manner, the VIP/signal database maintains a record of suitable verification graphic/DUT connections, and can be referenced to suggest recommended connections while building future graphical environments.

Step 540 involves generating test simulation code based on the graphical environment. For example, in response to receiving a command, such as a generation input signal, via the user interface, a code generating program generates simulation code that is based at least in part on the source code associated with each verification graphic in the graphical environment model and each generated connection signal. The test simulation code can be configured to simulate the operation of the DUT within a design verification environment represented by the graphical environment when executed. In some embodiments, method 500 also formats the code so that it is suitable for simulation on a particular simulator.

The method 500 can also include the step 545 of sending or transmitting the test simulation code to a simulator that can simulate testing of DUT. The transmission can occur by formatting the source code onto a computer readable storage medium and delivering the source code to a computer configured to operate the simulator. In some embodiments the source code can be transmitted via the internet, email, or another mode of electronic communication.

At step 550, the method 500 includes verifying the DUT in a simulator by executing the test simulation code. In some embodiments, the simulator can be operated on the same machine, or machines that generated the test simulation code. Alternatively, the simulation can occur on other machines that were not involved with the generation of the test simulation code.

The presently described verification tool allows for the creation of a verification environment using a graphical user interface. In some aspects, the verification tool can automatically generate a UVM-based, bug-free verification environments more efficiently and effectively than if the environment were manually coded. The environments generated by the verification tool can be, for example, cross-simulator, compilable, well documented, and scalable. Moreover, the verification tool can generate environments that have a uniform structure that eases the maintenance, reuse and hand over.

In some embodiments, the verification tool software can be pre-loaded, or originally provided with a VIP library that is preloaded with verification graphics that can be added to a graphical environment. The verification graphics can be associated with source code that, when executed represents a verification module (e.g., a VIP) that interacts with a DUT. The VIP library can be extended by the user, for example, by adding verification graphics to the VIP library using the verification graphic builder program of the verification tool.

In some embodiments, the verification tool allows for automatic instantiating of all verification graphics (e.g., VIPs) in an environment. The verification tool also facilitates connecting the verification graphic TLM ports and callbacks to the scoreboard.

Some embodiments of the verification tool provide tools that allow a user to navigate through the environment between a graphical representation and the source code. The verification tool can also provide a graphical wizard that connects VIPs interfaces to the DUT signals.

In some embodiments, computers operating the verification tool can maintain a database of all the previous connected signals within the customer premises, which can later be used to facilitate the matching and/or connection process.

The verification tool can provide a clear, easy to understand view of a design verification environment and its development status (e.g., how much of the coding building the environment has been completed). The verification tool can also provide a clear view of how many signals have been connected to the DUT, which components of the environment have been added/completed, and which components are in progress.

The present disclosure describes preferred embodiments and examples of the present technology. Reference throughout this specification to "one embodiment," "an embodiment," or similar language means that a particular feature, structure, or characteristic described in connection with the embodiment is included in at least one embodiment of the present invention. The embodiments shown in the drawings, if any, and as described above are merely for illustrative purposes and not intended to limit the scope of the invention. Moreover, those skilled in the art will recognize that a wide variety of modifications, alterations, and combinations can be made with respect to the above described embodiments without departing from the scope of the invention as set forth in the claims, and that such modifications, alterations, and combinations are to be viewed as being within the ambit of the inventive concept. Thus, appearances of the phrases "in one embodiment," "in an embodiment," and similar language throughout this specification may, but do not necessarily, refer to the same embodiment. All references cited in the present disclosure are hereby incorporated by reference in their entirety.

The invention claimed is:

1. A computer processor configured to generate code simulating testing on an integrated circuit device, the processor being in communication with a user interface and a memory, the processor configured to execute:
   an environment builder that displays a graphical environment model on the user interface, the graphical environment model displaying a device under test graphic, a verification graphic, and at least one connection graphic connecting the device under test graphic and the verification graphic, the device under test graphic associated with source code that simulates an integrated circuit device, the verification graphic associated with source code that simulates a verification module, and the at least one connection graphic being associated with source code that simulates connection signals between the verification module and the integrated circuit device;
   a code generator that generates test simulation code that simulates operation of the integrated circuit device upon execution; and
   a navigation program that controls the display of source code associated with graphical environment model on the user interface,
   wherein the navigation program controls the level of detail of the graphical environment model displayed via the user interface in response to receiving a detail control input signal via the user interface, wherein the code generator is configured to generate a test simulation code in response to receiving an interface input signal, the test simulation code based at least in part on the source code associated with the verification graphic, the source code associated with the device under test graphic, and the source code associated with the at least one connection graphic, and wherein the test simulation code is generated in a format for execution on a simulator to simulate testing on the integrated circuit device.

2. The processor of claim 1, wherein the processor is further configured to execute further a signal connector program that controls the connection graphics connecting the verification graphic and the device under test graphic in the graphical environment model.

3. The processor of claim 2, wherein the memory maintains a connection graphic array that includes at least one available connection graphic corresponding to source code that simulates a connection between a verification module in the graphical environment model and the integrated circuit device.

4. The processor of claim 3, wherein the signal connector program controls the display of the array of available connection graphics via the user interface and assigns at least one connection graphic from the array of available connection signals to represent a connection between the device under test graphic and the verification graphic in response to receiving an add-connection input signal from the user interface.

5. The processor of claim 4, wherein the processor further executes a learning program that maintains in the memory a database of connection graphics associated with verification graphics and device under test graphics, wherein the learning program updates the database in response to each assignment of a connection graphic to the graphical environment model by the signal connector program.

6. The processor of claim 5, wherein the learning program determines at least one recommended connection graphic to be added to the graphical environment model based at least in part on the verification graphics in the graphical environment model, the device under test graphics in the graphical environment model, and the connection graphics in the database of connection graphics in the memory.

7. The processor of claim 6, wherein the array of available connection graphics displayed by the signal connector program includes at least one recommended connection signal displayed with an indicator that distinguishes the recommended connection signal from other connection signals in the array.

8. The processor of claim 6, wherein the signal connector program automatically selects a recommended connection signal for at least one verification graphic.

9. The processor of claim 1, wherein the navigation program is further configured to display source code associated with a verification graphic in the graphical user environment in response to a cursor hovering over the verification graphic.

10. The processor of claim 1, wherein the navigation program is further configured to interact with an external editor program to allow source code associated with the graphics in the graphical environment model to be modified via through external editor program via the user interface.

11. The processor of claim 1, wherein the navigation program is further configured to display and enable the modification of process parameters associated with at least one of a device under test graphic, a verification graphic, and a connection graphic in response to the receipt of a graphic selection signal via the user interface.

12. The processor of claim 11, wherein the graphic selection signal is sent in response to a user selecting at least one of a device under test graphic, a verification graphic, and a connection graphic via the user interface, and wherein the process parameters include at least one of a variable, a task, and a function associated with the selected graphic.

13. The processor of claim 1, wherein the user interface generates the interface input signal in response to receiving a generation signal via the user interface.

14. The processor of claim 1, wherein the user interface generates the interface input signal in response to the environment builder making a change to the graphical environment model.

15. A method for generating test simulation code that is configured to simulate testing of an integrated circuit device upon execution, the method performed on a computer having a memory, a processor, and a user interface, the method comprising:
displaying a device under test graphic on the user interface as a component of a graphical environment model, the device under test graphic corresponding to source code that executes on a simulator to represent an integrated circuit device;
in response to receiving an add-graphic input signal, displaying at least one verification graphic as an element of a graphical environment model, each verification graphic associated with source code that executes on a simulator to simulate a verification model interacting with the integrated circuit device;
assigning, with the processor, at least one connection signal to the verification graphic in the graphical environment model, each connection signal corresponding to source code that executes on a simulator to represent a connection between the verification model and the integrated circuit device; and
in response to receiving an interface input signal, generating with the processor a test simulation code based at least in part on the source code associated with the verification graphic and the assigned connection signal in the graphical environment model, the test code simulating the operation of the integrated circuit device upon execution on a simulator.

16. The method of claim 15, further comprising executing the test simulation code on a simulator.

17. The method of claim 15, wherein at least one connection signal assigned to the verification graphic in the graphical environment model is a signal from an array of available connection signals maintained in the memory.

18. The method of claim 17, further comprising updating the array of available connection signals in response to each assignment of a connection signal to the verification graphic added to the graphical environment model.

19. The method of claim 18, further comprising, in response to receiving a detail control input signal via the user interface, adjusting the level of detail of the graphical environment model displayed on the user interface.

20. The method of claim 15, wherein the user interface transmits the interface input signal in response to any change being made to the graphical environment model.

21. The method of claim 15, wherein the generation of the test simulation code comprises at least one of generating new test simulation code and regenerating a previously generated test simulation code.

22. A method for generating test simulation code that is configured to simulate testing of an integrated circuit device upon execution, the method performed on a computer having a memory, a processor, and a user interface, the method comprising:

- displaying a device under test graphic on the user interface as a component of a graphical environment model, the device under test graphic corresponding to source code that executes on a simulator to represent an integrated circuit device;
- in response to receiving an add-graphic input signal, displaying at least one verification graphic as an element of a graphical environment model, each verification graphic associated with source code that executes on a simulator to simulate a verification model interacting with the integrated circuit device;
- assigning, with the processor, at least one connection signal to the verification graphic in the graphical environment model, each connection signal corresponding to source code that executes on a simulator to represent a connection between the verification model and the integrated circuit device; and
- displaying on the user interface, in response to receiving a display control input signal via the user interface, source code associated with the graphical environment model.

* * * * *